(12) United States Patent
Uchida et al.

(10) Patent No.: US 8,964,309 B2
(45) Date of Patent: Feb. 24, 2015

(54) IMAGE PICKUP OPTICAL SYSTEM AND IMAGE PICKUP APPARATUS USING THE SAME

(71) Applicant: Olympus Corporation, Tokyo (JP)

(72) Inventors: Yoshihiro Uchida, Tokyo (JP); Sanae Oki, Tokyo (JP)

(73) Assignee: Olympus Corporation, Tokyo (JP)

( * ) Notice: Subject to any disclaimer, the term of this patent is extended or adjusted under 35 U.S.C. 154(b) by 27 days.

(21) Appl. No.: 13/789,954

(22) Filed: Mar. 8, 2013

(65) Prior Publication Data

US 2013/0242412 A1    Sep. 19, 2013

(30) Foreign Application Priority Data

Mar. 19, 2012 (JP) .................................. 2012-062485
Mar. 19, 2012 (JP) .................................. 2012-062507
Dec. 12, 2012 (JP) .................................. 2012-271072

(51) Int. Cl.
  *G02B 9/60*    (2006.01)
  *G02B 13/00*   (2006.01)
(52) U.S. Cl.
  CPC ................................. *G02B 13/0045* (2013.01)
  USPC ........................................................ 359/764
(58) Field of Classification Search
  CPC .. G02B 13/001; G02B 13/0045; G02B 13/18; G02B 13/22
  USPC ........................................................ 359/764
  See application file for complete search history.

(56) References Cited

U.S. PATENT DOCUMENTS

2010/0253829 A1*  10/2010  Shinohara ..................... 348/340

FOREIGN PATENT DOCUMENTS

| JP | 2007-264180 A | 10/2007 |
| JP | 2010-048996 A | 3/2010 |
| JP | 2010-262270 A | 11/2010 |
| JP | 2011-095513 A | 5/2011 |
| JP | 2011-232772 A | 11/2011 |

* cited by examiner

*Primary Examiner* — Alicia M Harrington
(74) *Attorney, Agent, or Firm* — Brosemer, Kolefas & Associates, LLC

(57) ABSTRACT

An image pickup optical system includes in order from an object side, a first lens having a positive refractive power, a second lens having a negative refractive power, a third lens having a positive refractive power, a fourth lens having a positive refractive power, and a fifth lens having a negative refractive power. An aperture stop is disposed nearest to the object side, and the first lens has a biconvex shape. An image-side surface of the third lens has in a peripheral portion, an area of which, a refractive power becomes weaker as compared to a refractive power of a central portion thereof. An object-side optical function surface of the fourth lens has a concave shape, and an object-side surface of the fifth lens has a concave shape.

11 Claims, 30 Drawing Sheets

FIG. 30A
FIG. 30B
FIG. 30C
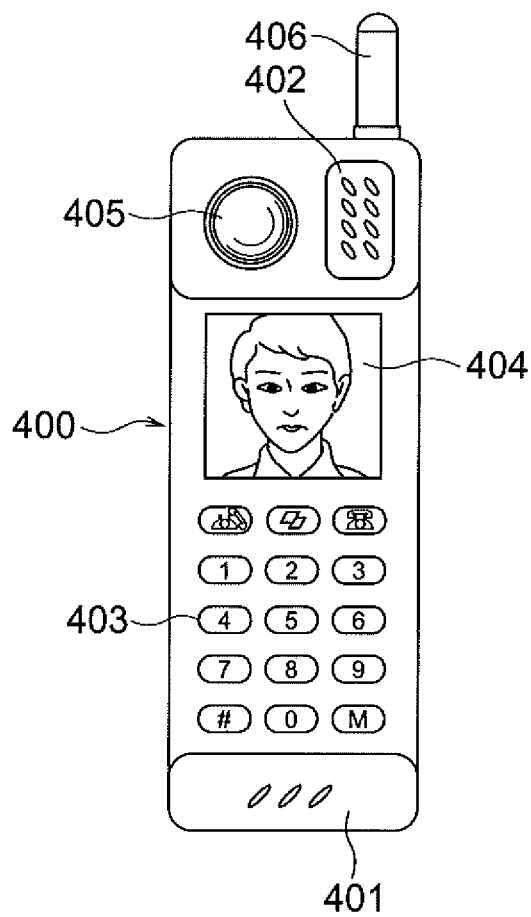
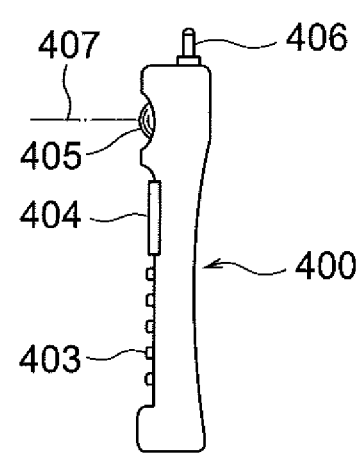
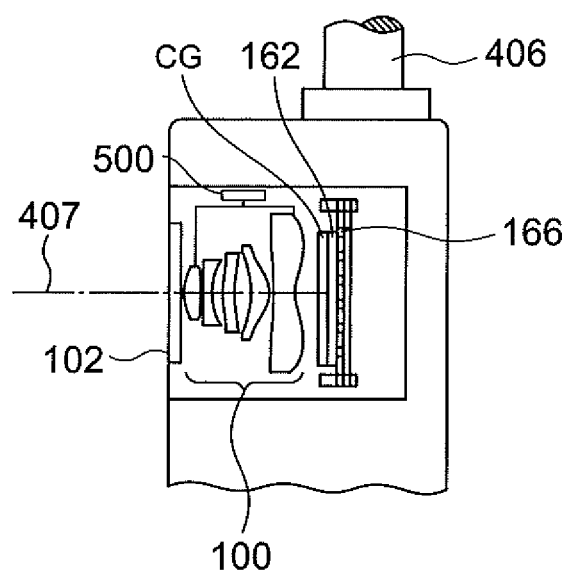

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2012-062485 filed on Mar. 19, 2012, 2012-062507 filed on Mar. 19, 2012 and 2012-271072 filed on Dec. 12, 2012.

BACKGROUND OF THE INVENTION

1. Field of the Invention

The present invention relates to an image pickup optical system and an image pickup apparatus using the same.

2. Description of the Related Art

In recent years, with slimming of a portable telephone and a portable terminal, or a notebook-size personal computer, a camera module in which, a length of an optical system in an optical axial direction is reduced to the utmost limit has been sought. Moreover, with the advancement of technology related to an image pickup element in recent years, and with increasing needs of the market, an increase in a size of an image pickup element, and an increase in the number of pixels have been progressing. With such progress, a lens having a high resolution has been sought. In order to fulfill the need, a single-focus optical system which includes five aspheric lenses has been proposed (Japanese Patent Application Laid-open Publication Nos. 2007-264180, 2010-048996, 2011-095513, 2010-262270, and 2011-232772).

SUMMARY OF THE INVENTION

An image pickup optical system according to the present invention comprises in order from an object side,
a first lens having a positive refractive power,
a second lens having a negative refractive power,
a third lens having a positive refractive power,
a fourth lens having a positive refractive power, and
a fifth lens having a negative refractive power, and
an aperture stop is disposed nearest to the object side, and
the first lens has a biconvex shape, and
an image-side surface of the third lens has in a peripheral portion, an area of which, a refractive power becomes weaker as compared to a refractive power of a central portion thereof, and
an object-side optical function surface of the fourth lens has a concave shape, and
an object-side surface of the fifth lens has a concave shape.

An image pickup optical system according to the present invention comprises in order from an object side,
a first lens having a positive refractive power,
a second lens having a negative refractive power,
a third lens having a positive refractive power,
a fourth lens having a positive refractive power, and
a fifth lens having a negative refractive power, and
the fourth lens is a meniscus lens having a convex surface directed toward an image side,
an aperture stop is disposed nearest to the object side, and
the following conditional expression is satisfied.

$0.5 < TL/(2 \times IH) < 1.5$ where,
TL denotes an overall length of the image pickup optical system, and
IH denotes an image height.

Moreover, an image pickup apparatus according to the present invention comprises the abovementioned image pickup optical system, and an image pickup element.

BRIEF DESCRIPTION OF THE DRAWINGS

FIG. 30A, FIG. 30B, and FIG. 30C are diagrams showing a portable telephone which is an example of the information processing apparatus in which, the optical system according to the present invention has been built-in as a photographic optical system, where, FIG. 30A is a front view of a portable telephone 400, FIG. 30B is a side view of the portable telephone 400, and FIG. 30C is a cross-sectional view of a photographic optical system 405.

DETAILED DESCRIPTION OF THE INVENTION

An image pickup optical system according to a first aspect of the present embodiment will be described below. The image pickup optical system according to the first aspect of the present embodiment includes in order from an object side, a first lens having a positive refractive power, a second lens having a negative refractive power, a third lens having a positive refractive power, a fourth lens having a positive refractive power, and a fifth lens having a negative refractive power, and an aperture stop is disposed nearest to the object side, and an image-side surface of the third lens has in a peripheral portion thereof, an area of which, a refractive power becomes weaker as compared to a refractive power of a central portion thereof.

In the image pickup optical system according to the first aspect of the present embodiment, a refractive-power arrangement in order from the object side is a positive refractive power, a negative refractive power, a positive refractive power, a positive refractive power, and a negative refractive power. By adopting such refractive-power arrangement, it is possible to bring a position of a principal point of the image pickup optical system on the object side. As a result, since it becomes possible to shorten the overall length of the optical system sufficiently with respect to a focal length of the overall image pickup optical system, it is possible to realize shortening of the overall length of the optical system.

Moreover, by letting the fourth lens to have a positive refractive power, and including five lenses in all to form the optical system, it is possible to suppress divergence of an off-axis bundle of light, at the fourth lens. Therefore, it is possible to make an outer diameter of the fifth lens small while bringing the optical system closer to a telecentric state. Moreover, it is preferable to let a shape of the first lens to be a biconvex shape, and to let an object-side surface of the fifth lens to be concave-shaped.

Moreover, in the image pickup optical system according to the first aspect of the present embodiment, by disposing the aperture stop nearest to the object side, it is possible to keep an exit pupil away from an image plane. Accordingly, it is possible to make small an angle of an off-axis principal ray with respect to an optical axis. As a result, it is possible to shorten the overall length of the optical system and to avoid degradation of sensitivity of a peripheral portion of an image pickup element while bringing the optical system closer to the telecentric state.

Furthermore, in the image pickup optical system according to the first aspect of the present embodiment, the image-side surface of the third lens has in the peripheral portion thereof, an area of which, a refractive power becomes weaker as compared to the refractive power of the central portion.

By making such an arrangement, it is possible to correct favorably a curvature of field and a coma of high order.

Figure 1:
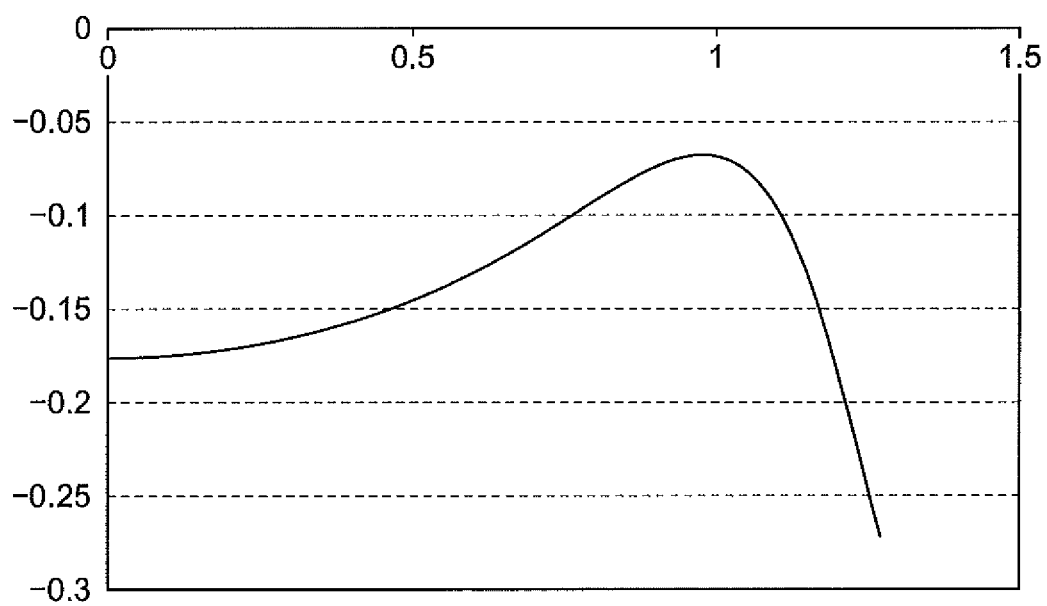
FIG. 1 is a diagram showing a change in a refractive power of an image-side surface of a third lens.

A change in the refractive power of the image-side surface of the third lens (a first embodiment) is shown in FIG. 1. A vertical axis indicates the refractive power and a horizontal axis indicates a diameter (distance from the optical axis). As shown in FIG. 1, in the first embodiment, the image-side surface of the third lens has a negative refractive power as a whole. However, the refractive power of a central portion, or in other words, near the optical axis (where a value of diameter is 0) is approximately −0.175 whereas, the refractive power of the peripheral portion (where a value of diameter is 1) is approximately −0.068. In such manner, the image-side surface of the third lens has in the peripheral portion, the area of which, the refractive power becomes weaker as compared to the refractive power of the central portion.

For a state in which, the refractive power of the central portion is negative and the refractive power of the peripheral portion is weaker as compared to the refractive power of the central portion, there are two possible situations. One situation is that the refractive power of the peripheral portion is negative and the refractive power is weaker as compared to the refractive power of the central portion, and the other situation is that the refractive power of the peripheral portion is positive.

Moreover, in the image pickup optical system according to the first aspect of the present embodiment, it is preferable that an image-side surface of the second lens has a shape such that a convex surface is directed toward the object side.

By making such an arrangement, it is possible to make large an angle of emergence of a light ray which is emerged from the second lens. Accordingly, since it is possible to increase a height of the off-axis ray, it is possible to correct the curvature of field and the coma of high order in the third lens. It is preferable that the shape having the convex surface directed toward the object side is a shape with the convex surface directed toward the object side for the overall image-side surface (from an optical axial center up to a periphery).

Moreover, in the image pickup optical system according to the first aspect of the present embodiment, it is preferable that an object-side surface of the fourth lens has a concave shape. Furthermore, it is preferable that the object-side surface of the fourth lens has a shape with a concave surface directed toward the object side throughout from an optical axial center up to a periphery.

By making such an arrangement, it is possible to suppress an occurrence of the coma.

Moreover, in the image pickup optical system according to the first aspect of the present embodiment, it is preferable that the following conditional expression (1) is satisfied.

$$0.1 < f_1/f_3 < 0.8 \quad (1)$$

where,
$f_1$ denotes a focal length of the first lens, and
$f_3$ denotes a focal length of the third lens.

Conditional expression (1) is a conditional expression which is preferable for correcting the spherical aberration and the coma favorably. By satisfying conditional expression (1), it is possible to distribute appropriately an allocation of the refractive power of the first lens and the refractive power of the third lens. As a result, it is possible to correct the spherical aberration and the coma favorably. Moreover, in a case in which, the overall length of the optical system has been shortened, it is possible to prevent sensitivity with respect to decentering, from becoming high.

When a lower limit value of conditional expression (1) is not reached, the focal length of the first lens becomes excessively short (the refractive power becomes excessively large) as compared to the focal length of the third lens. In such case, since a decentering sensitivity of the first lens becomes high, it becomes difficult to correct the spherical aberration and the coma favorably. Moreover, when the values surpass the range of conditional expression (1), since it is not possible to make a Petzval's sum small, correction of the curvature of field becomes difficult.

Whereas, when an upper limit value of conditional expression (1) is surpassed, the focal length of the third lens becomes excessively short (the refractive power becomes excessively large) as compared to the focal length of the first lens. In such case, since the decentering sensitivity of the third lens becomes high, it becomes difficult to correct the spherical aberration and the coma favorably.

Here, it is more preferable that the following conditional expression (1') is satisfied instead of conditional expression (1)

$$0.2 < f_1/f_3 < 0.5 \quad (1')$$

Moreover, it is even more preferable that the following conditional expression (1") is satisfied instead of conditional expression (1).

$$0.2 < f_1/f_3 < 0.4 \quad (1'')$$

Moreover, in the image pickup optical system according to the first aspect of the present embodiment, it is preferable that an object-side surface of the third lens has a shape such that a convex surface is directed toward the object side.

When the optical system is let to have a large aperture, the occurrence of the coma becomes remarkable. Therefore, by making an arrangement as described above, it is possible to correct the coma favorably.

Moreover, in the image pickup optical system according to the first aspect of the present embodiment, it is preferable that the following conditional expression (2) is satisfied.

$$-2.6 < IH/EXP < -0.5 \quad (2)$$

where,
EXP denotes a position of an exit pupil of the image pickup optical system, and
IH denotes an image height.

By satisfying the conditional expression (2), when the overall length of the optical system is shortened, it is possible to position the exit pupil toward the image side. Accordingly, it is possible to suppress a change in an angle of incidence and an angle of emergence of a light ray at each lens surface. As a result, it is possible to suppress the occurrence of the coma and the curvature of field. The angle of incidence means an angle made by a light ray and a normal of a lens surface at a position where the light ray is incident. Moreover, the angle of emergence means an angle made by a light ray and a normal of a lens surface at a position from where the light ray emerges.

Here, it is more preferable that the following conditional expression (2') is satisfied instead of conditional expression (2).

$$-1.7 < IH/EXP < -0.8 \quad (2')$$

Moreover, it is even more preferable that the following conditional expression (2") is satisfied instead of conditional expression (2).

$$-1.3 < IH/EXP < -1.0 \quad (2'')$$

Moreover, in the image pickup optical system according to the first aspect of the present embodiment, it is preferable that the following conditional expression (3) is satisfied.

$$1.8 < f_3/f_4 < 16.2 \quad (3)$$

Where,
$f_3$ denotes a focal length of the third lens, and
$f_4$ denotes a focal length of the fourth lens.

Conditional expression (3) is a conditional expression which is preferable for correcting an aberration of an off-axis bundle of light and in a case in which, the overall length of the optical system is shortened, for preventing the sensitivity with respect to the decentering, from becoming high. By satisfying conditional expression (3), it is possible to distribute appropriately the refractive power of the third lens and the refractive power of the fourth lens. As a result, it is possible to correct the aberration of the off-axis bundle of light favorably. Moreover, in a case in which, the overall length of the optical system is shortened; it is possible to prevent the sensitivity with respect to the decentering, from becoming high.

When a lower limit value of conditional expression (3) is not reached, the focal length of the third lens becomes excessively short (the refractive power becomes excessively large). In such case, since an angle of the off-axis bundle of light emerged from the third lens becomes small, a height of a light ray at the fourth lens does not become sufficiently high. Here, it is necessary to make a light ray with a height of some extent to be incident on the fifth lens. Therefore, an angle of emergence of light rays emerging from the fourth lens has to be made large. As a result, correction of the coma, and the curvature of field of a high order becomes difficult.

Whereas, when an upper limit of conditional expression (3) is surpassed, the focal length of the fourth lens as compared to the focal length of the third lens becomes excessively short (the refractive power becomes excessively large). Therefore, for correcting the curvature of field, a peripheral portion of the fourth lens has to be made an aspheric surface, and a curvature of the aspheric surface has to be made small (a radius of curvature has to be made large). As a result, since a difference in a curvature (radius of curvature) of a central portion of the fourth lens and the curvature (radius of curvature) of the peripheral portion becomes large, the sensitivity of the fourth lens with respect to decentering becomes high.

Here, it is more preferable that the following conditional expression (3') is satisfied instead of conditional expression (3).

$$2.8 < f_3/f_4 < 10.5 \quad (3')$$

Moreover, it is even more preferable that the following conditional expression (3") is satisfied instead of conditional expression (3).

$$3.6 < f_3/f_4 < 8.1 \quad (3'')$$

Moreover, in the image pickup optical system according to the first aspect of the present embodiment, it is preferable that the following conditional expression (4) is satisfied.

$$1.4 < EA_5/EA_4 < 1.9 \quad (4)$$

where, $EA_4$ denotes an effective aperture of the fourth lens, and
$EA_5$ denotes an effective aperture of the fifth lens.

Conditional expression (4) is a conditional expression which is preferable for correcting favorably the coma and the curvature of field of high order, and in a case in which, the overall length of the optical system is shortened, to prevent the sensitivity with respect to decentering, from becoming high. By satisfying conditional expression (4), it is possible to maintain the height of light rays at the fourth lens and the fifth lens at an appropriate height. As a result, it is possible to correct favorably the coma and the curvature of field of high order. Moreover, in a case in which, the overall length of the optical system is shortened; it is possible to prevent the sensitivity with respect to the decentering, from becoming high.

When a lower limit value of conditional expression (4) is not reached, since the angle of emergence of light rays emerging from the fourth lens has to be made large, correction of the coma and the curvature of field of high order becomes difficult.

When an upper limit value of conditional expression (4) is surpassed, since the angle of incidence of the light rays at the fourth lens become large, correction of the coma and correction of the curvature of field of high order become difficult.

Here, it is more preferable that the following conditional expression (4') is satisfied instead of conditional expression (4).

$$1.5 < EA_5/EA_4 < 1.8 \quad (4')$$

Furthermore, an image pickup optical system according to a second aspect of the present embodiment will be described below. The image pickup optical system according to the second aspect of the present embodiment includes in order from an object side, a first lens having a positive refractive power, a second lens having a negative refractive power, a third lens having a positive refractive power, a fourth lens having a positive refractive power, and a fifth lens having a negative refractive power, and the fourth lens is a meniscus lens having a convex surface directed toward an image side, and an aperture stop is disposed nearest to the object side, and the following conditional expression (5) is satisfied.

$$0.5 < TL/(2 \times IH) < 1.5 \quad (5)$$

where,

TL denotes an overall length of the image pickup optical system, and

IH denotes an image height.

In the image pickup optical system according to the second aspect of the present embodiment, a refractive-power arrangement in order from the object side is a positive refractive power, a negative refractive power, a positive refractive power, a positive refractive power, and a negative refractive power. By adopting such refractive-power arrangement, it is possible to bring a position of a principal point of the image pickup optical system on the object side. As a result, since it becomes possible to shorten the overall length of the optical system sufficiently with respect to a focal length of the overall image pickup optical system, it is possible to realize shortening of the overall length of the optical system.

Moreover, by letting the fourth lens to have a positive refractive power, and including five lenses in all to form the optical system, it is possible to suppress divergence of an off-axis bundle of light, at the fourth lens. Therefore, it is possible to make an outer diameter of the fifth lens small while bringing the optical system closer to a telecentric state. Moreover, by letting the fourth lens to be a meniscus lens having the convex surface directed toward the image side, it is possible to suppress an occurrence of the coma to be small.

Moreover, in the image pickup optical system according to the second aspect of the present embodiment, by disposing the aperture stop nearest to the object side, it is possible to keep an exit pupil away from an image plane. Accordingly, it is possible to make small an angle of an off-axis principal ray with respect to an optical axis. As a result, it is possible to shorten the overall length of the optical system and to avoid degradation of sensitivity of a peripheral portion of an image pickup element while bringing the optical system closer to the telecentric state.

Furthermore, in the image pickup optical system according to the second aspect of the present embodiment, the following conditional expression (5) is satisfied.

$$0.5 < TL/(2 \times IH) < 1.5 \quad (5)$$

where,

TL denotes an overall length of the image pickup optical system, and

IH denotes an image height.

Conditional expression (5) is a conditional expression related to the overall length of the optical system. IH can also be half of a diagonal length of an image pickup surface of the image pickup element.

When a lower limit value of conditional expression (5) is not reached, it is possible to further shorten the overall length of the optical system, but a thickness of the lens becomes thin and a distance between the lenses is narrowed. Therefore, since a range in which, the shape of the lens (radius of curvature and thickness) can be changed freely becomes narrow, aberration correction becomes difficult. Whereas, when an upper limit value of conditional expression (5) is surpassed, the overall length of the optical system becomes long.

Here, it is preferable that the following conditional expression (5') is satisfied instead of conditional expression (5).

$$0.6 < TL/(2 \times IH) < 1.3 \quad (5')$$

Moreover, is more preferable that the following conditional expression (5") is satisfied instead of conditional expression (5).

$$0.75 < TL/(2 \times IH) < 1.00 \quad (5")$$

Moreover, in the image pickup optical system according to the second aspect of the present embodiment, it is preferable that the following conditional expression (6) is satisfied.

$$1.5 < f_3/f < 2.5 \quad (6)$$

where, $f_3$ denotes a focal length of the third lens, and f denotes a focal length of the overall image pickup optical system.

Conditional expression (6) is a conditional expression which is preferable for correcting favorably a longitudinal chromatic aberration. When the conditional expression (6) is satisfied, since it is possible to suppress a paraxial refractive power at the third lens to be small, it is possible to suppress an increase in the longitudinal chromatic aberration.

When a lower limit value of conditional expression (6) is surpassed, the focal length of the third lens becomes short (the refractive power becomes large). In such case, since there is an increase in the longitudinal chromatic aberration, correction of the longitudinal chromatic aberration becomes difficult. Whereas, when an upper limit value of conditional expression (6) is surpassed, since the focal length of the third lens becomes long (the refractive power becomes small), the overall length of the optical system becomes long.

Here, it is more preferable that the following conditional expression (6') is satisfied instead of conditional expression (6).

$$1.5 < f_3/f < 2.4. \quad (6')$$

It is even more preferable that the following conditional expression (6") is satisfied instead of conditional expression (6).

$$1.53 < f_3/f < 2.35 \quad (6")$$

Moreover, in the image pickup optical system according to the second aspect of the present embodiment, it is preferable that a shape of the third lens is a meniscus shape having a convex surface directed toward the object side.

In a case in which, the optical system is let to have a large aperture, the longitudinal chromatic aberration occurs substantially. Therefore, by letting the third lens to have the abovementioned shape, it is possible to carry out correction of the longitudinal chromatic aberration favorably.

Moreover, in the image pickup optical system according to the second aspect of the present embodiment, it is preferable that an image-side surface of the third lens has a shape such that a concave surface is directed toward an image side near an optical axis, and a shape such that a convex surface is directed toward the image side at a peripheral portion.

By making such an arrangement, a difference in heights of off-axis rays at the third lens, or in other words, a difference in a height of a light ray at the object-side surface and a height of a light ray at the image-side surface becomes large. As a result, it is possible carry out favorable aberration correction, particularly, favorable correction of the coma at the fourth lens.

Moreover, in the image pickup optical system according to the second aspect of the present embodiment, it is preferable that the following conditional expression (7) is satisfied.

$$2.0 < r_7/f < 3.0 \quad (7)$$

where, $r_7$ denotes a paraxial radius of curvature of an image-side surface of the third lens, and f denotes a focal length of the overall image pickup optical system.

Conditional expression (7) is a conditional expression which is preferable for correcting various aberrations, particularly the coma, while shortening the overall length of the optical system.

When a lower limit value of conditional expression (7) is not reached, the paraxial radius of curvature of the image-side surface of the third lens becomes small. In such case, since an angle of a light ray incident on the image-side surface of the third lens becomes sharp, correction of the coma becomes difficult.

Whereas, when an upper limit value of conditional expression (7) is surpassed, a paraxial radius of curvature of the object-side surface of the third lens becomes large. As a result, since the difference in a height of a light ray at the third lens and a height of a light ray at the fourth lens becomes small, correction of the coma, and the curvature of field of high order becomes difficult.

Here, it is more preferable that following conditional expression (7') is satisfied instead of conditional expression (7).

$$2.00 < r_7/f < 2.98 \quad (7')$$

Moreover, it is even more preferable that the following conditional expression (7") is satisfied instead of conditional expression (7).

$$2.10 < r_7/f < 2.95 \quad (7")$$

Moreover, in the image pickup optical system according to the second aspect of the present embodiment, it is preferable that the following conditional expression (8) is satisfied.

$$0.4 < \Sigma d_L/f < 0.55 \quad (8)$$

where, $\Sigma d_L$ denotes a total thickness of lenses of the image pickup optical system, and f denotes a focal length of the image pickup optical system.

Conditional expression (8) is a conditional expression for shortening the overall length of the optical system while suppressing the occurrence of aberration. When the conditional expression (8) is satisfied, since it is possible to make the thickness of lenses thin, it is possible to secure a wide air space between the adjacent lenses. As a result, since a range in which, the shape of the lens can be changed freely becomes wide, it is possible to correct the aberration favorably. $\Sigma d_L$ is the total thickness of the lenses in a case in which, there is no air conversion.

When a lower limit value of conditional expression (8) is not reached, since the lenses become further thinner, it becomes difficult to correct the aberration favorably even by changing the shape of the lenses. Furthermore, manufacturing of lenses also becomes difficult.

Whereas, when an upper limit value of conditional expression (8) is surpassed, since the thickness of each lens becomes thick, it is possible to carry out comparatively favorable aberration correction even without changing the shape of the lens surface substantially. However, since the overall length of the optical system becomes long, shortening of the overall length of the optical system becomes difficult.

Here, it is more preferable that the following conditional expression (8') is satisfied instead of conditional expression (8).

$$0.42 < \Sigma d_L/f < 0.55 \quad (8')$$

Moreover, it is even more preferable that the following conditional expression (8") is satisfied instead of conditional expression (8).

$$0.44 < \Sigma d_L/f < 0.54 \quad (8")$$

Moreover, in the image pickup optical system according to the second aspect of the present embodiment, it is preferable that the following conditional expression (9) is satisfied.

$$0.05 < (r_{10} + r_{11})/(r_{10} - r_{11}) < 0.6 \quad (9)$$

where, $r_{10}$ denotes a paraxial radius of curvature of an object-side surface of the fifth lens, and $r_{11}$ denotes a paraxial radius of an image-side surface of the fifth lens.

Conditional expression (9) is a conditional expression which is preferable for securing sufficiently a distance between the fifth lens and the image pickup element, and particularly, a distance between the fifth lens and the image pickup element at a peripheral portion, and for bringing the optical system closer to the telecentric state. By satisfying conditional expression (9), it is possible to secure sufficiently a distance between the fifth lens and the image pickup element, particularly at a peripheral area of the image pickup element. Moreover, it is possible to prevent degradation of peripheral brightness.

When a lower limit value of conditional expression (9) is not reached, a negative refractive power of the object-side surface of the fifth lens becomes excessively large. In such case, since a principal point of the fifth lens is positioned toward the object side, a back-focus length becomes short.

Whereas, when an upper limit value of conditional expression (9) is surpassed, the paraxial radius of curvature of the image-side surface of the fifth lens becomes excessively large. In such case, near an effective aperture, it is not possible to position the image-side surface of the fifth lens on the object side. As a result, in the peripheral portion of the image pickup element, the distance between the image-side surface of the fifth lens and the image pickup element becomes short.

In a case in which, the conditional expression (9) is not satisfied, since it becomes difficult to bring closer to the telecentric state, it becomes difficult to avoid degradation of peripheral brightness.

Here, it is more preferable that the following conditional expression (9') is satisfied instead of conditional expression (9).

$$0.05 < (r_{10} + r_{11})/(r_{10} - r_{11}) < 0.55 \quad (9')$$

Moreover, it is even more preferable that the following conditional expression (9") is satisfied instead of conditional expression (9).

$$0.055 < (r_{10} + r_{11})/(r_{10} - r_{11}) < 0.540 \quad (9")$$

Moreover, in the image pickup optical system according to the second aspect of the present embodiment, it is preferable that the aperture stop is positioned at an image side of an object-side vertex of the first lens. By making such an arrangement, when upper-side rays of an off-axis bundle of light are incident on the object-side surface of the first lens, it is possible to make an angle of incidence at the object-side surface small. Therefore, it is possible to reduce the occurrence of coma.

Moreover, in an image pickup optical system according to the second aspect of the present embodiment, it is preferable that each of the first lens, the second lens, the third lens, the fourth lens, and the fifth lens are formed of a resin. By making such an arrangement, it is possible to provide the image pickup optical system at a low price.

Moreover, an image pickup apparatus according to the present embodiment includes the image pickup optical system described above, and an image pickup element. It is possible to realize an image pickup apparatus using an image pickup optical system in which, a lens diameter is maintained to be small, and various aberrations, particularly the coma, are corrected favorably, while being an optical system with a comparatively small F-number.

Moreover, in the image pickup apparatus according to the present embodiment, it is preferable that the image pickup optical system and the image pickup element are integrated. By integrating the image pickup optical system and the image pickup element, it is possible to convert an optical image captured by the image pickup optical system, to an electric signal. Moreover, by selecting an electronic image pickup element which is capable of reducing a change in brightness at a central portion of an image and at a peripheral portion of the image, it is possible to provide an image pickup apparatus having a small size and improved performance.

Moreover, in the image pickup apparatus according to the present embodiment, it is preferable that the image pickup optical system is integrated with an auto-focus mechanism. By integrating the auto-focus mechanism, it is possible to focus at any object-distance.

Examples of an image pickup optical system and an image pickup apparatus will be described below in detail by referring to the accompanying diagrams. However, the present invention is not restricted to the examples described below. Moreover, as to whether the refractive power is positive or negative is based on the paraxial radius of curvature. Moreover, the aperture stop is positioned nearest to the object side. However, as it has been mentioned above, the aperture stop is positioned on the object side of the image-side surface of the first lens. More concretely, the aperture stop is positioned between the object-side surface of the first lens and the image-side surface of the first lens. Such a position of the aperture stop is also to be included in 'the aperture is positioned nearest to the object side'.

Figure 2:
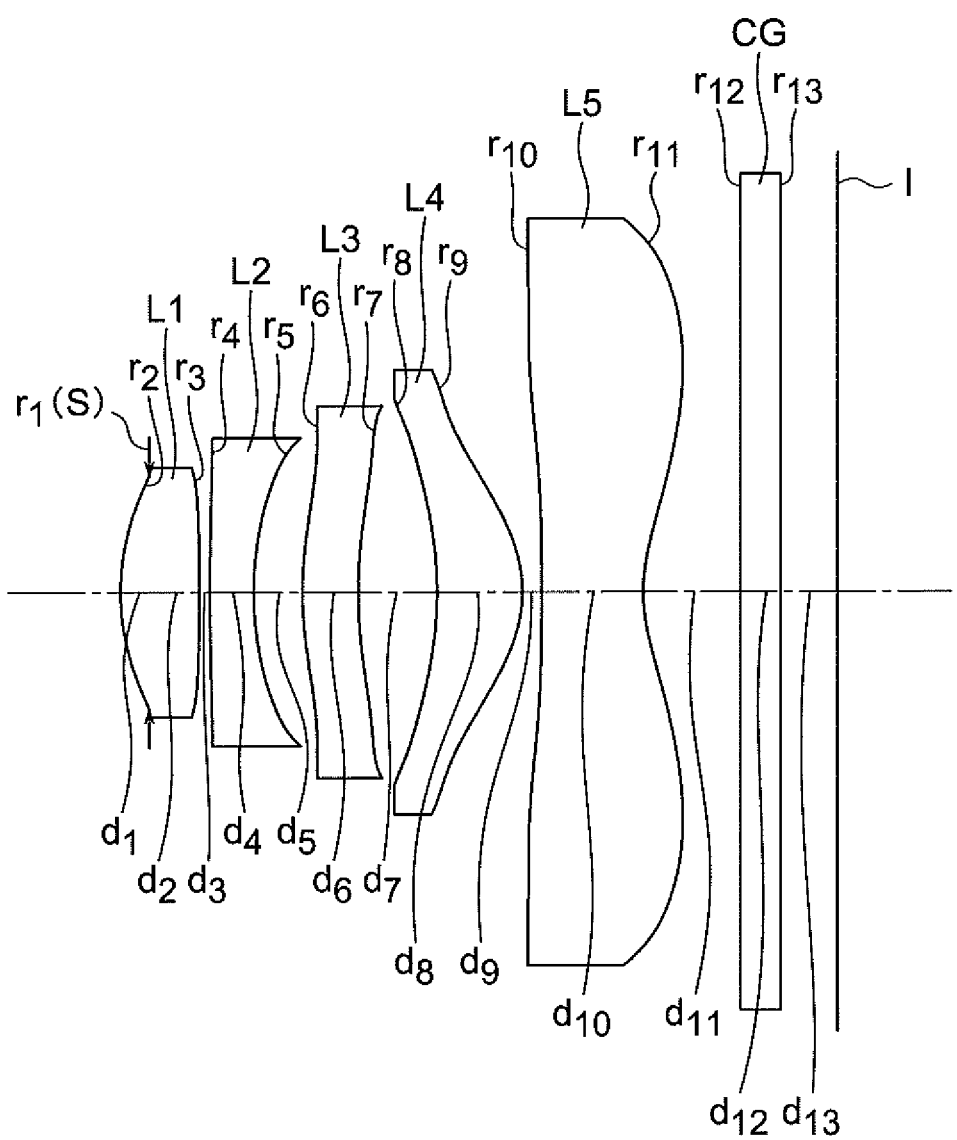
FIG. 2 is a cross-sectional view along an optical axis showing an optical arrangement at the time of infinite object point focusing of an image pickup optical system according to a first example of the present invention.
Figure 3:
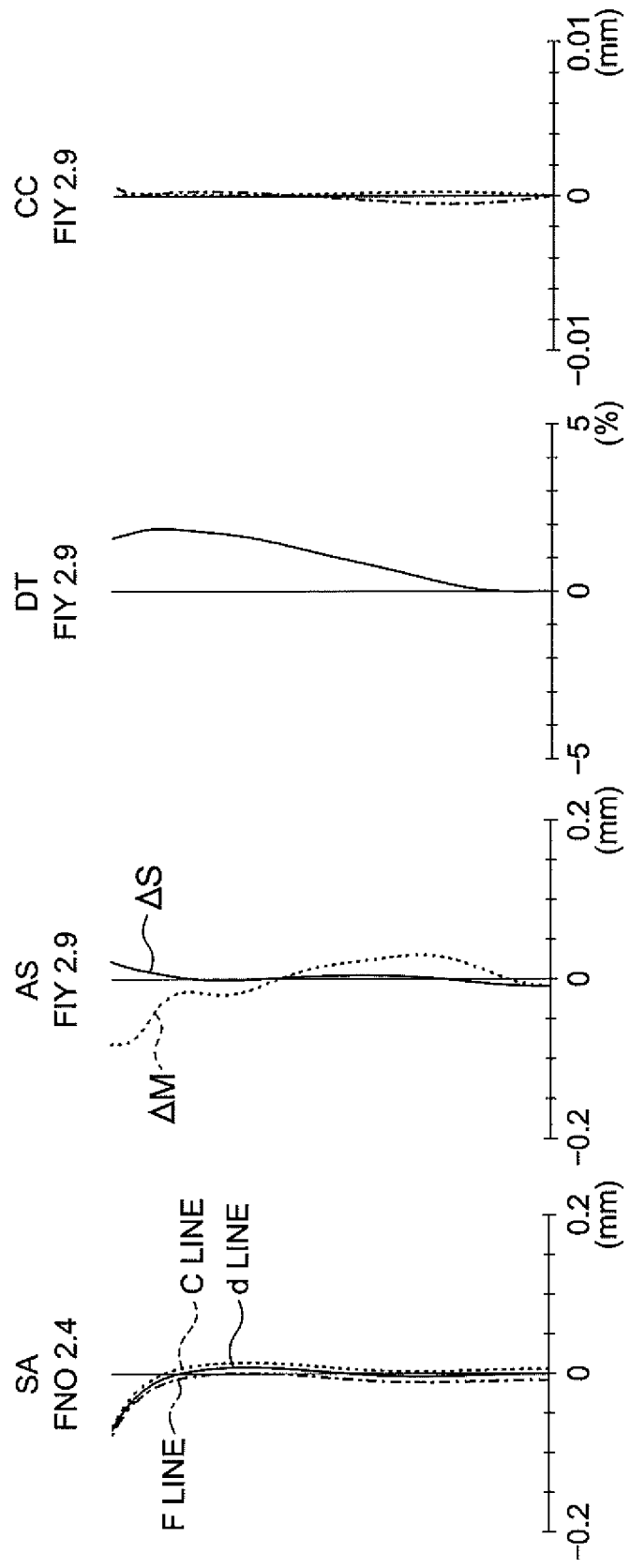
FIG. 3A, FIG. 3B, FIG. 3C, and FIG. 3D (hereinafter, 'FIG. 3A to FIG. 3D') are diagrams showing spherical aberration (SA), astigmatism (AS), distortion (DT), and chromatic aberration of magnification (CC) at the time of infinite object point focusing of the image pickup optical system according to the first example.

An image pickup optical system according to the first example will be described below. FIG. 2 is a cross-sectional view along an optical axis showing an optical arrangement at the time of infinite object point focusing of the image pickup optical system according to the first example.

FIG. 3A to FIG. 3D are aberration diagrams at the time of infinite object point focusing of the image pickup optical system according to the first example, and 'FIY' denotes an image height. Symbols in the aberration diagrams are common for all the examples which will be described later.

Moreover, in the aberration diagrams, FIG. 3A, FIG. 3B, FIG. 3C, and FIG. 3D show spherical aberration (SA), astigmatism (AS), distortion (DT), and chromatic aberration of magnification (CC) respectively.

The image pickup optical system according to the first example, as shown in FIG. 2, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power. In all the examples to be described below, in lens cross-sectional views, CG denotes a cover glass, and I denotes an image pickup surface of an image pickup element.

The first lens L1 is a biconvex positive lens. The second lens L2 is a negative meniscus lens having a convex surface directed toward the object side. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the second lens L2 has a shape such that a convex surface is directed toward the object side. Moreover, a lens surface on the object side of the third lens L3 has a shape such that a convex surface is directed toward the object side. Moreover, a lens surface on the image side of the third lens L3 has in a peripheral portion thereof, an area of which, a refractive power becomes weaker as compared to a refractive power of a central portion. Moreover, a lens surface on the object side of the fourth lens L4 has a shape such that a concave surface is directed toward the object side (a convex surface directed toward the image side) throughout from an optical axial center up to a periphery.

An aspheric surface is provided to both surfaces of each the first lens L1, the second lens L2, the third lens L3, the fourth lens L4, and the fifth lens L5 (hereinafter, 'the lenses from the first lens L1 to the fifth lens L5').

Figure 4:
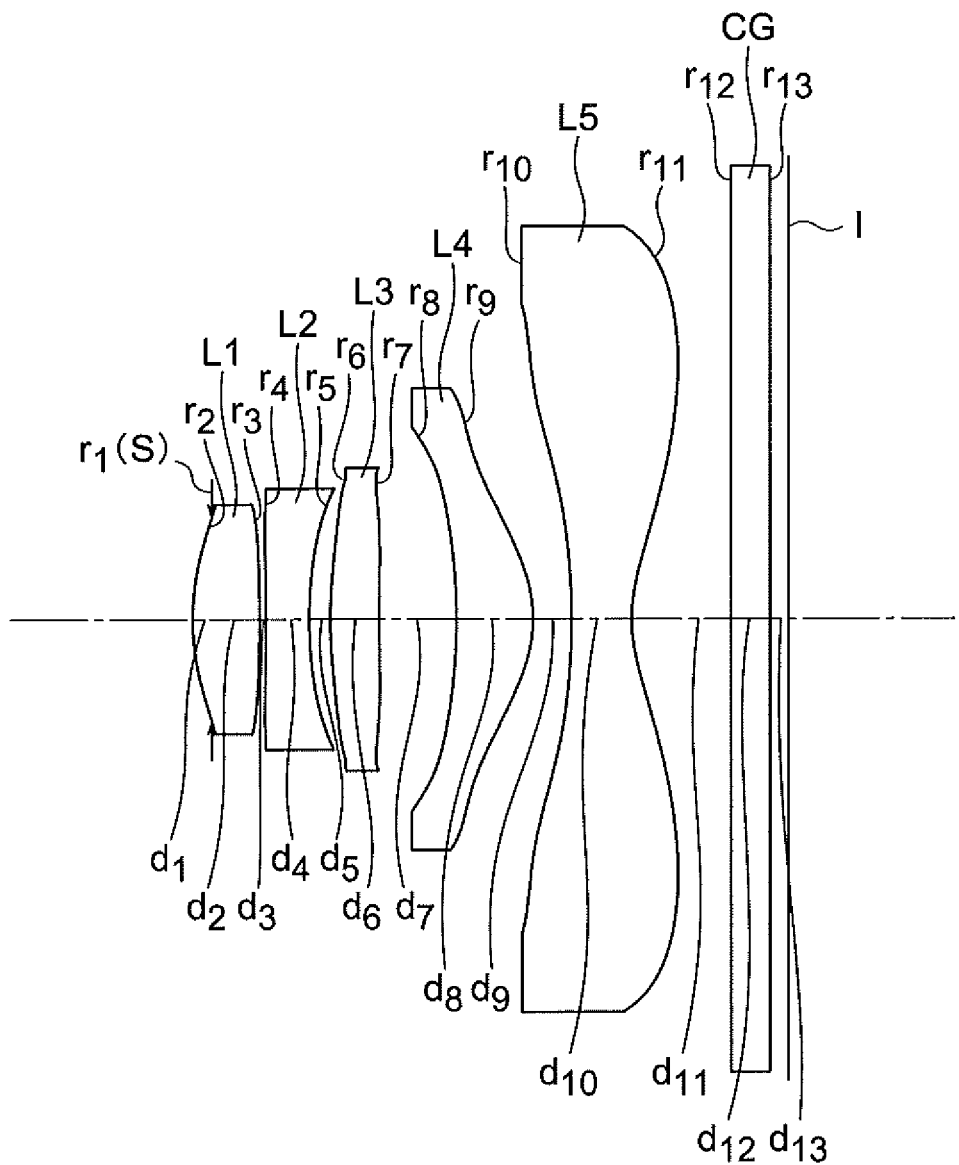
FIG. 4 is a cross-sectional view along an optical axis showing an optical arrangement at the time of infinite object point focusing of an image pickup optical system according to a second example of the present invention.
Figure 5:
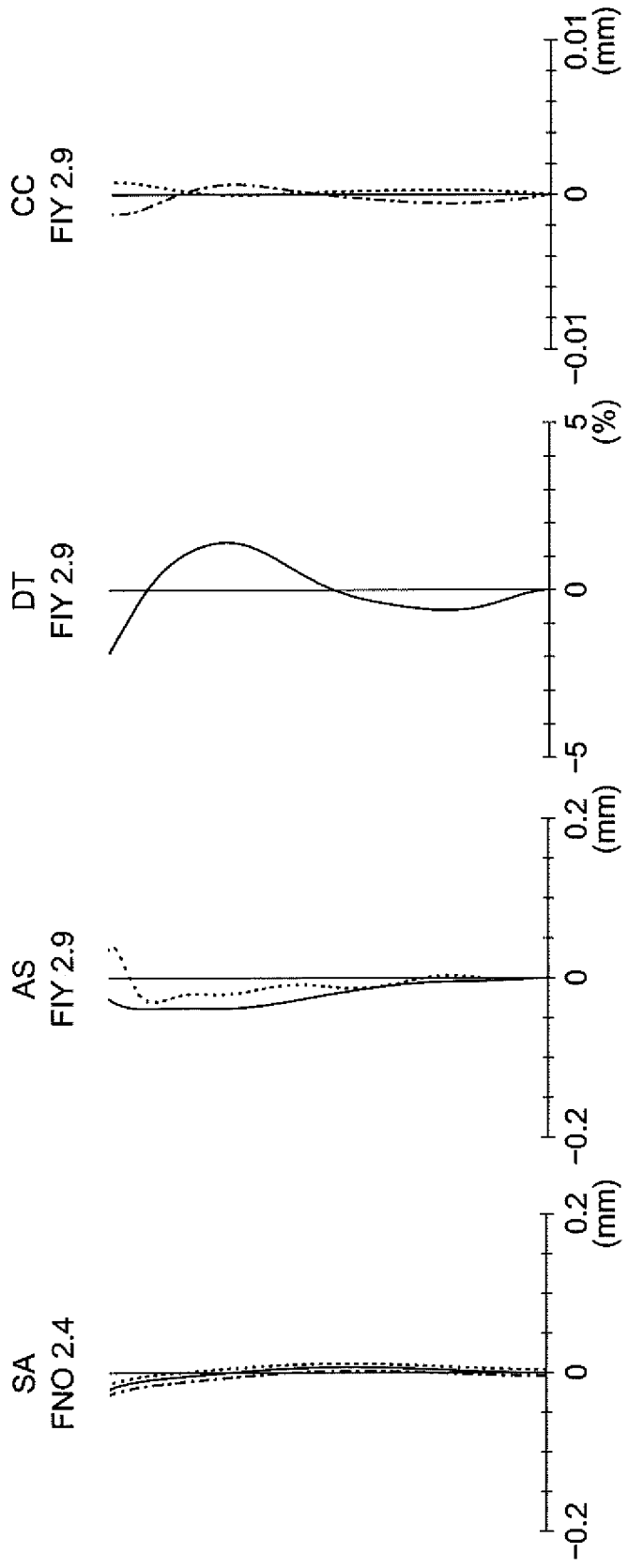
FIG. 5A, FIG. 5B, FIG. 5C, and FIG. 5D (hereinafter, 'FIG. 5A to FIG. 5D') are diagrams showing spherical aberration (SA), astigmatism (AS), distortion (DT), and chromatic aberration of magnification (CC) at the time of infinite object point focusing of the image pickup optical system according to the second example.

Next, an image pickup optical system according to a second example will be described below. FIG. 4 is a cross-sectional view along an optical axis showing an optical arrangement at the time of infinite object point focusing of the image pickup optical system according to the second example. Moreover, FIG. 5A to FIG. 5D are aberration diagrams at the time of infinite object point focusing of the image pickup optical system according to the second example.

The image pickup optical system according to the second example, as shown in FIG. 4, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a biconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the second lens L2 has a shape such that a convex surface is directed toward the object side. Moreover, a lens surface on the object side of the third lens L3 has a shape such that a convex surface is directed toward the object side. Moreover, a lens surface on the image side of the third lens L3 has in a peripheral portion thereof, an area of which, a refractive power becomes weaker as compared to a refractive power of a central portion. Moreover, a lens surface on the object side of the fourth lens L4 has a shape such that a concave surface is directed toward the object side (a convex surface directed toward the image side) throughout from an optical axial center up to a periphery.

An aspheric surface is provided to both surfaces of each of the lenses from the first lens L1 to the fifth lens L5.

Figure 6:
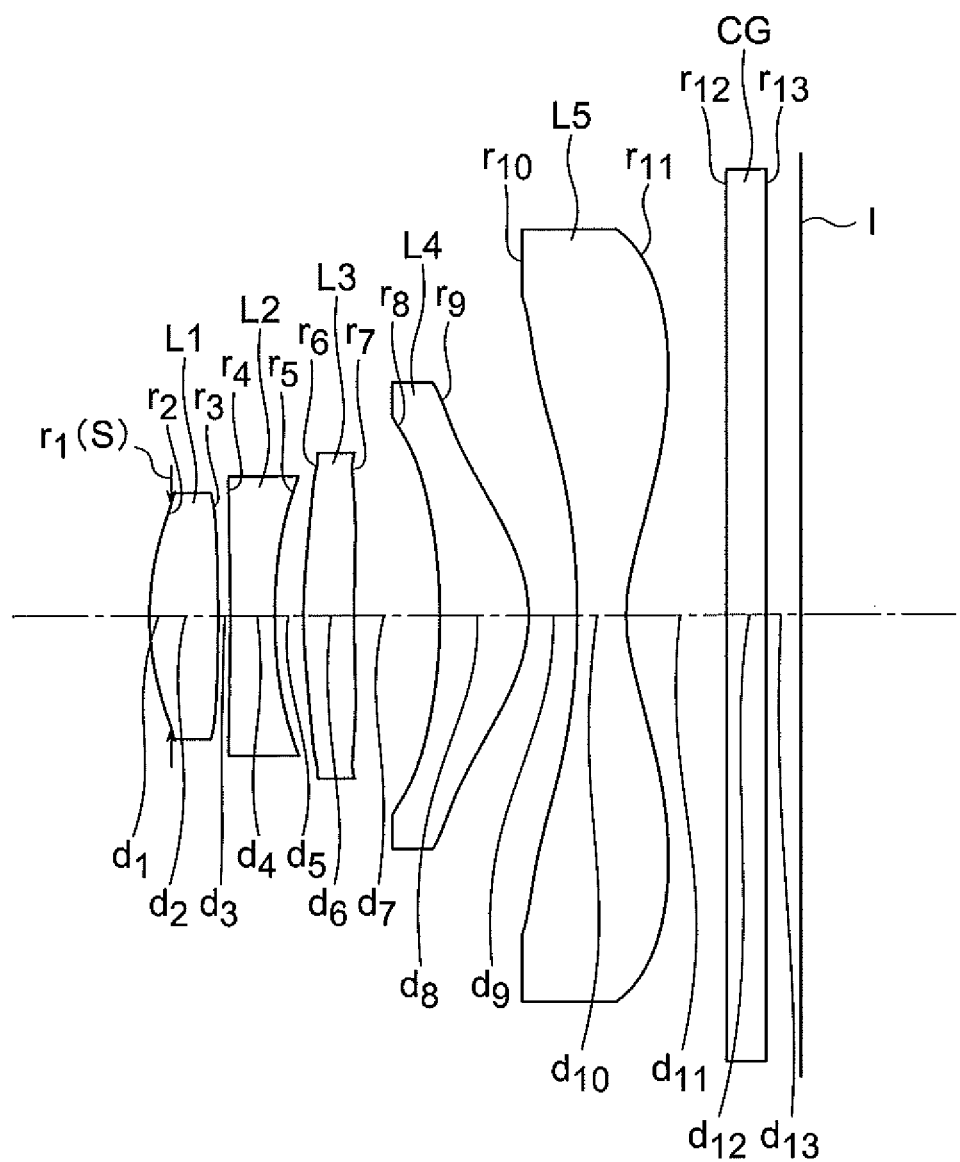
FIG. 6 is a cross-sectional view along an optical axis showing an optical arrangement at the time of infinite object point focusing of an image pickup optical system according to a third example of the present invention.
Figure 7:
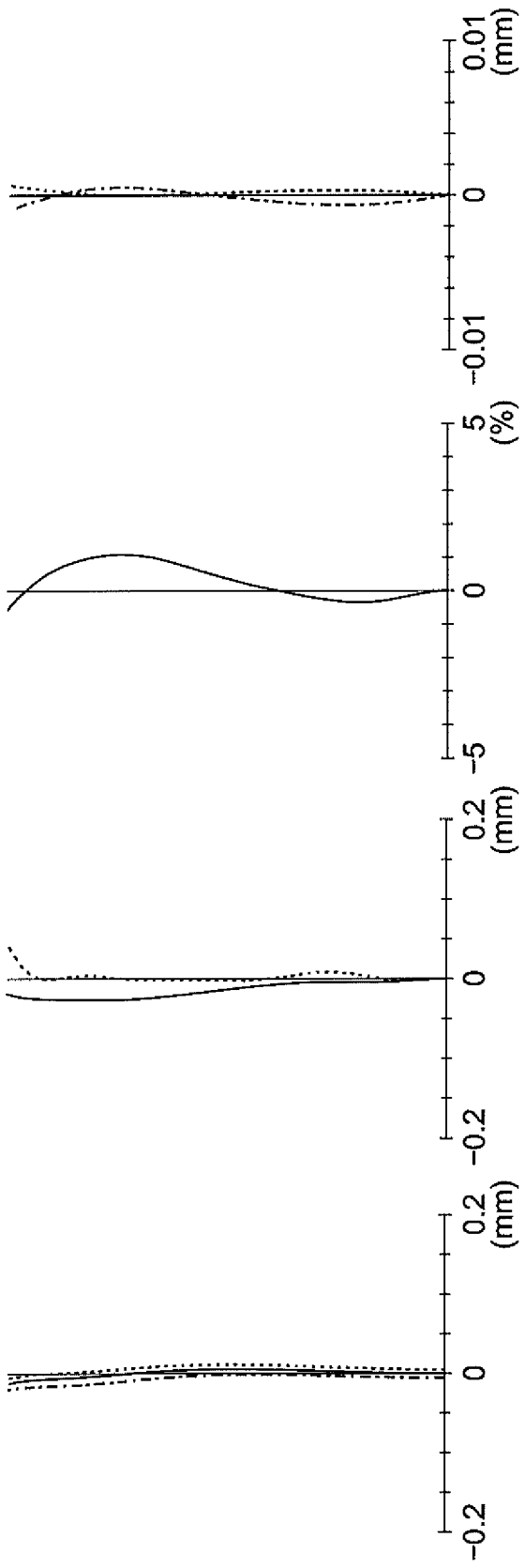
FIG. 7A, FIG. 7B, FIG. 7C, and FIG. 7D (hereinafter, 'FIG. 7A to FIG. 7D') are diagrams showing spherical aberration (SA), astigmatism (AS), distortion (DT), and chromatic aberration of magnification (CC) at the time of infinite object point focusing of the image pickup optical system according to the third example.

Next, an image pickup optical system according to a third example will be described below. FIG. 6 is a cross-sectional view along an optical axis showing an optical arrangement at the time of infinite object point focusing of the image pickup optical system according to the third example. Moreover, FIG. 7A to FIG. 7D are aberration diagrams at the time of infinite object point focusing of the image pickup optical system according to the third example.

The image pickup optical system according to the third example, as shown in FIG. 6, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a biconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the second lens L2 has a shape such that a convex surface is directed toward the object side. Moreover, a lens surface on the object side of the third lens L3 has a shape such that a convex surface is directed toward the object side. Moreover, a lens surface on the image side of the third lens L3 has in a peripheral portion thereof, an area of which, a refractive power becomes weaker as compared to a refractive power of a central portion. Moreover, a lens surface on the object side of the fourth lens L4 has a shape such that a concave surface is directed toward the object side (a convex surface directed toward the image side) throughout from an optical axial center up to a periphery.

An aspheric surface is provided to both surfaces of each of the lenses from the first lens L1 to the fifth lens L5.

Figure 8:
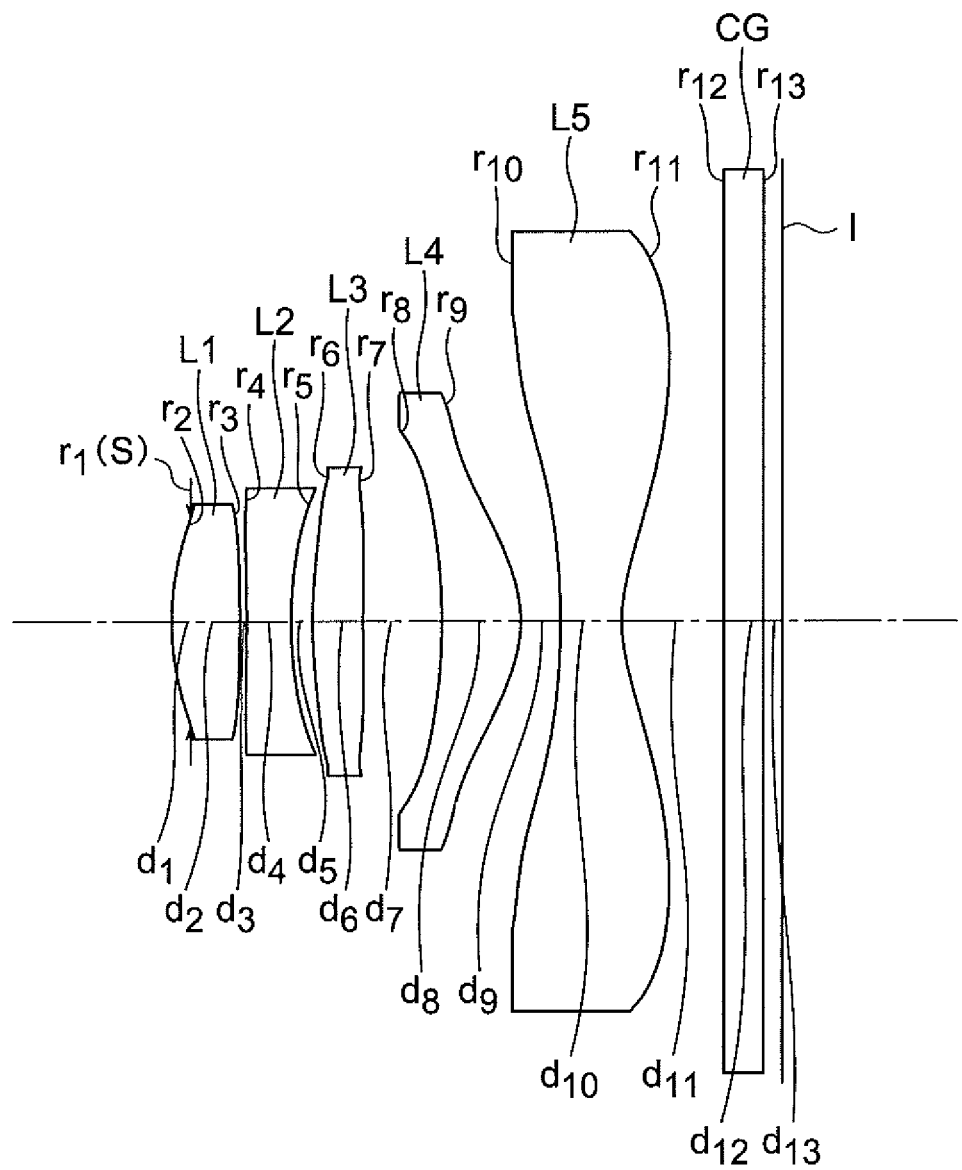
FIG. 8 is a cross-sectional view along an optical axis showing an optical arrangement at the time of infinite object point focusing of an image pickup optical system according to a fourth example of the present invention.
Figure 9:
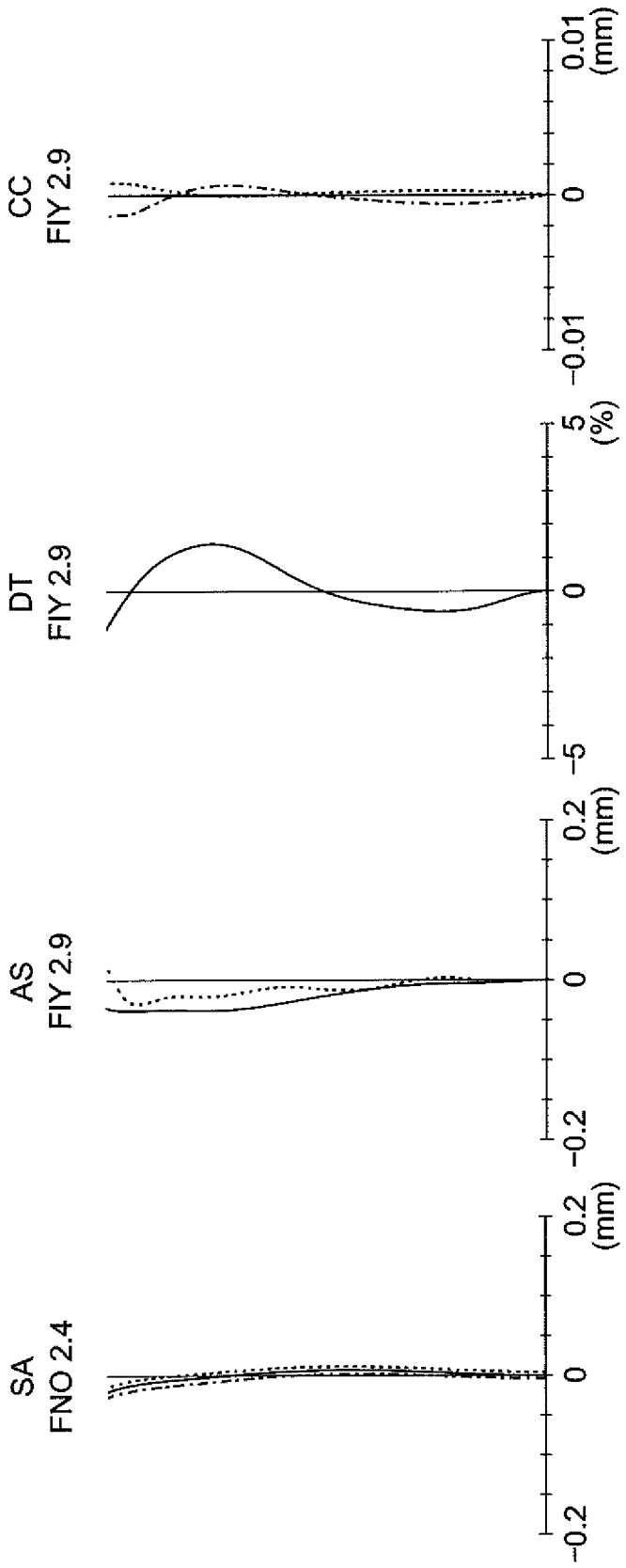
FIG. 9A, FIG. 9B, FIG. 9C, and FIG. 9D (hereinafter, 'FIG. 9A to FIG. 9D') are diagrams showing spherical aberration (SA), astigmatism (AS), distortion (DT), and chromatic aberration of magnification (CC) at the time of infinite object point focusing of the image pickup optical system according to the fourth example.

Next, an image pickup optical system according to a fourth example will be described below. FIG. 8 is a cross-sectional view along an optical axis showing an optical arrangement at the time of infinite object point focusing of the image pickup optical system according to the fourth example. Moreover, FIG. 9A to FIG. 9D are aberration diagrams at the time of infinite object point focusing of the image pickup optical system according to the fourth example.

The image pickup optical system according to the fourth example, as shown in FIG. 8, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a biconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the second lens L2 has a shape such that a convex surface is directed toward the object side. Moreover, a lens surface on the object side of the third lens L3 has a shape such that a convex surface is directed toward the object side. Moreover, a lens surface on the image side of the third lens L3 has in a peripheral portion thereof, an area of which, a refractive power becomes weaker as compared to a refractive power of a central portion. Moreover, a lens surface on the object side of the fourth lens has a shape such that a concave surface is directed toward the object side (a convex surface directed toward the image side) throughout from an optical axial center up to a periphery.

An aspheric surface is provided to both surfaces of each of the lenses from the first lens L1 to the fifth lens L5.

Figure 10:
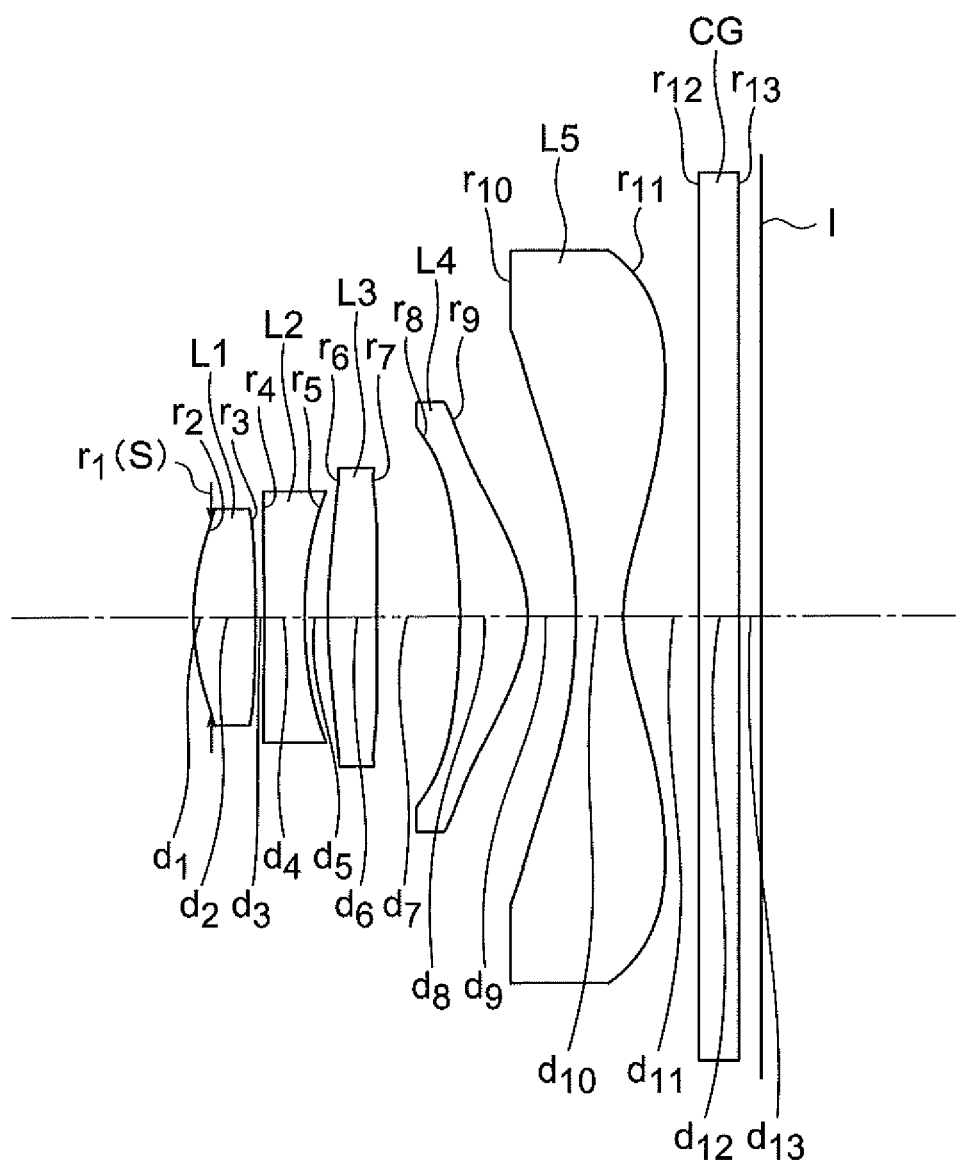
FIG. 10 is a cross-sectional view along an optical axis showing an optical arrangement at the time of infinite object point focusing of an image pickup optical system according to a fifth example of the present invention.
Figure 11:
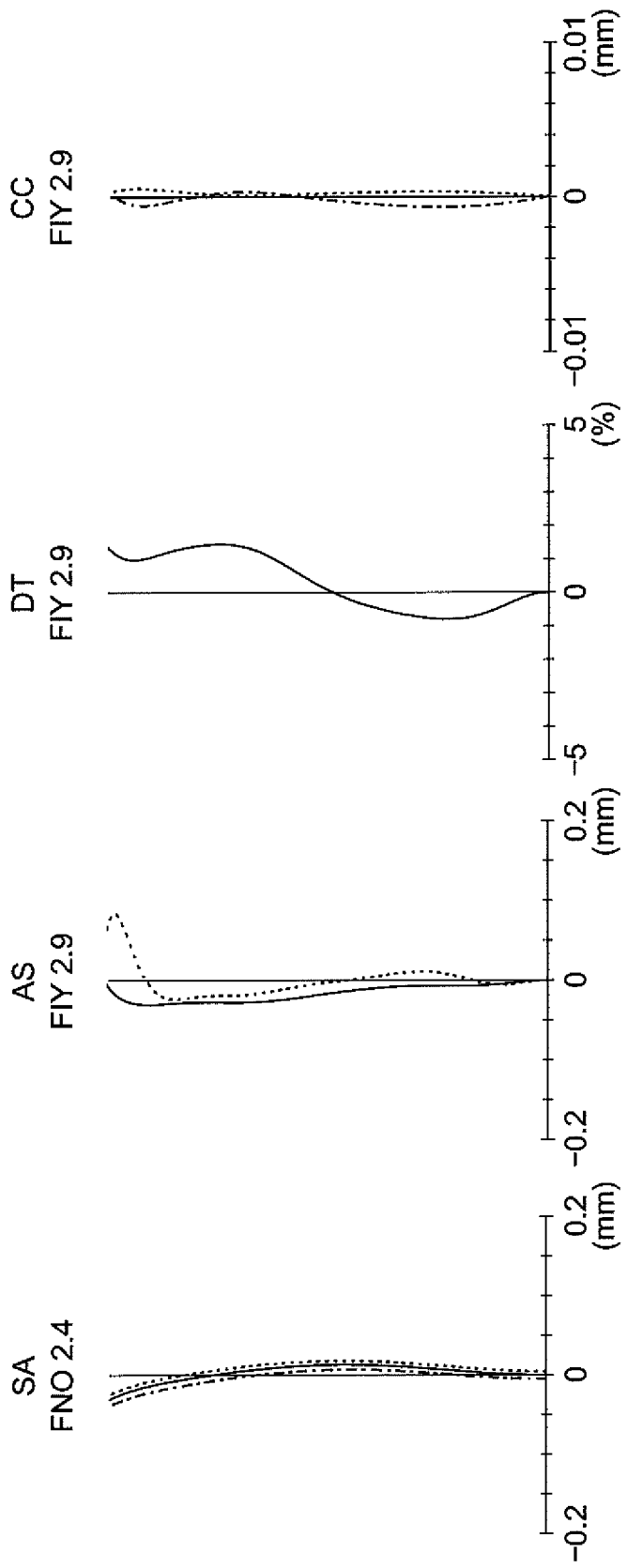
FIG. 11A, FIG. 11B, FIG. 11C, and FIG. 11D (hereinafter, 'FIG. 11A to FIG. 11D') are diagrams showing spherical aberration (SA), astigmatism (AS), distortion (DT), and chromatic aberration of magnification (CC) at the time of infinite object point focusing of the image pickup optical system according to the fifth example.

Next, an image pickup optical system according to a fifth example will be described below. FIG. 10 is a cross-sectional view along an optical axis showing an optical arrangement at the time of infinite object point focusing of the image pickup optical system according to the fifth example. Moreover, FIG. 11A to FIG. 11D are aberration diagrams at the time of infinite object point focusing of the image pickup optical system according to the fifth example.

The image pickup optical system according to the fifth example, as shown in FIG. 10, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a biconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the second lens L2 has a shape such that a convex surface is directed toward the object side. Moreover, a lens surface on the object side of the third lens L3 has a shape such that a convex surface is directed toward the object side. Moreover, a lens surface on the image side of the third lens L3 has in a peripheral portion thereof, an area of which, a refractive power becomes weaker as compared to a refractive power of a central portion. Moreover, a lens surface on the object side of the fourth lens has a shape such that a concave surface is directed toward the object side (a concave surface directed toward the image side) throughout from an optical axial center up to a periphery.

An aspheric surface is provided to both surfaces of each of the lenses from the first lens L1 to the fifth lens L5.

Figure 12:
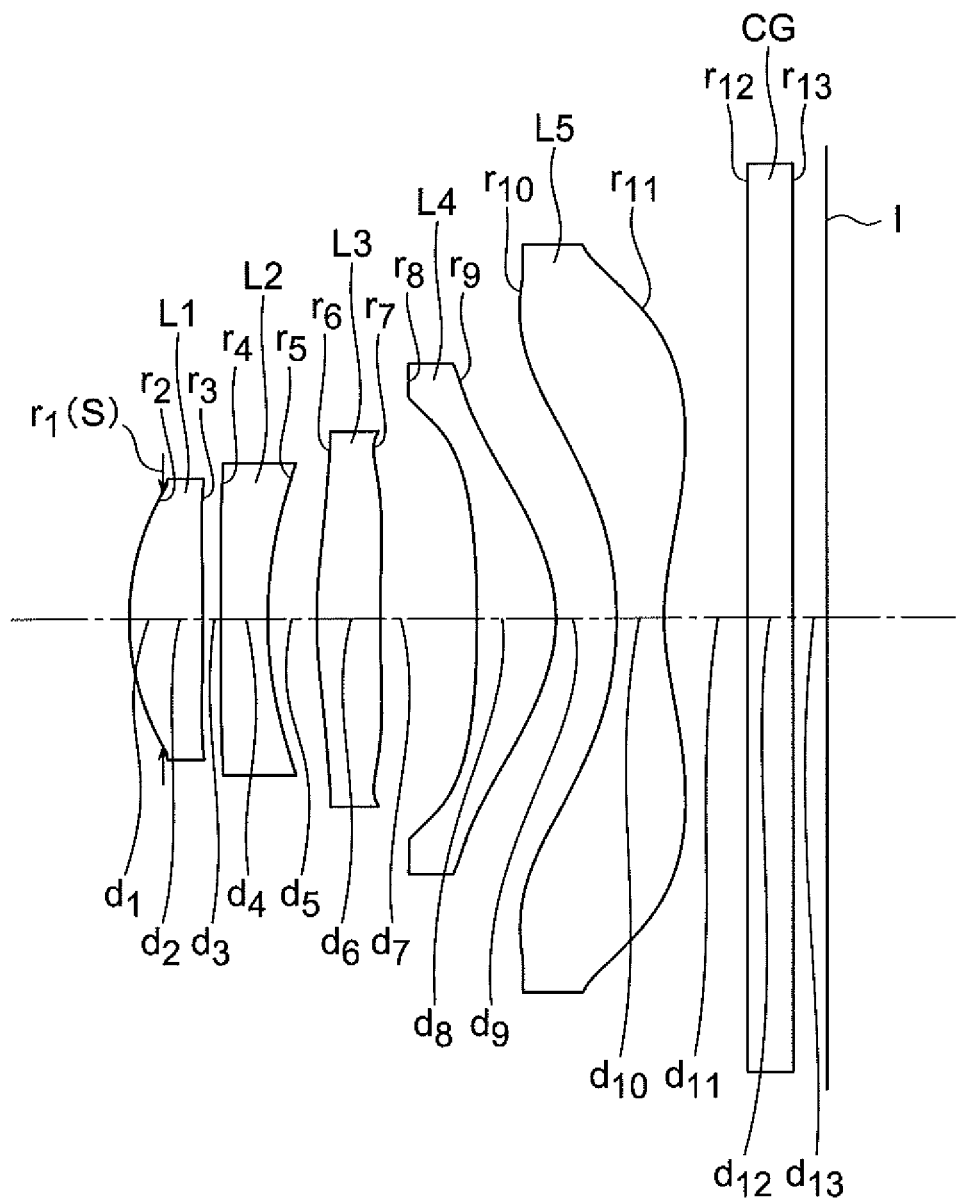
FIG. 12 is a cross-sectional view along an optical axis showing an optical arrangement at the time of infinite object point focusing of an image pickup optical system according to a sixth example of the present invention.
Figure 13:
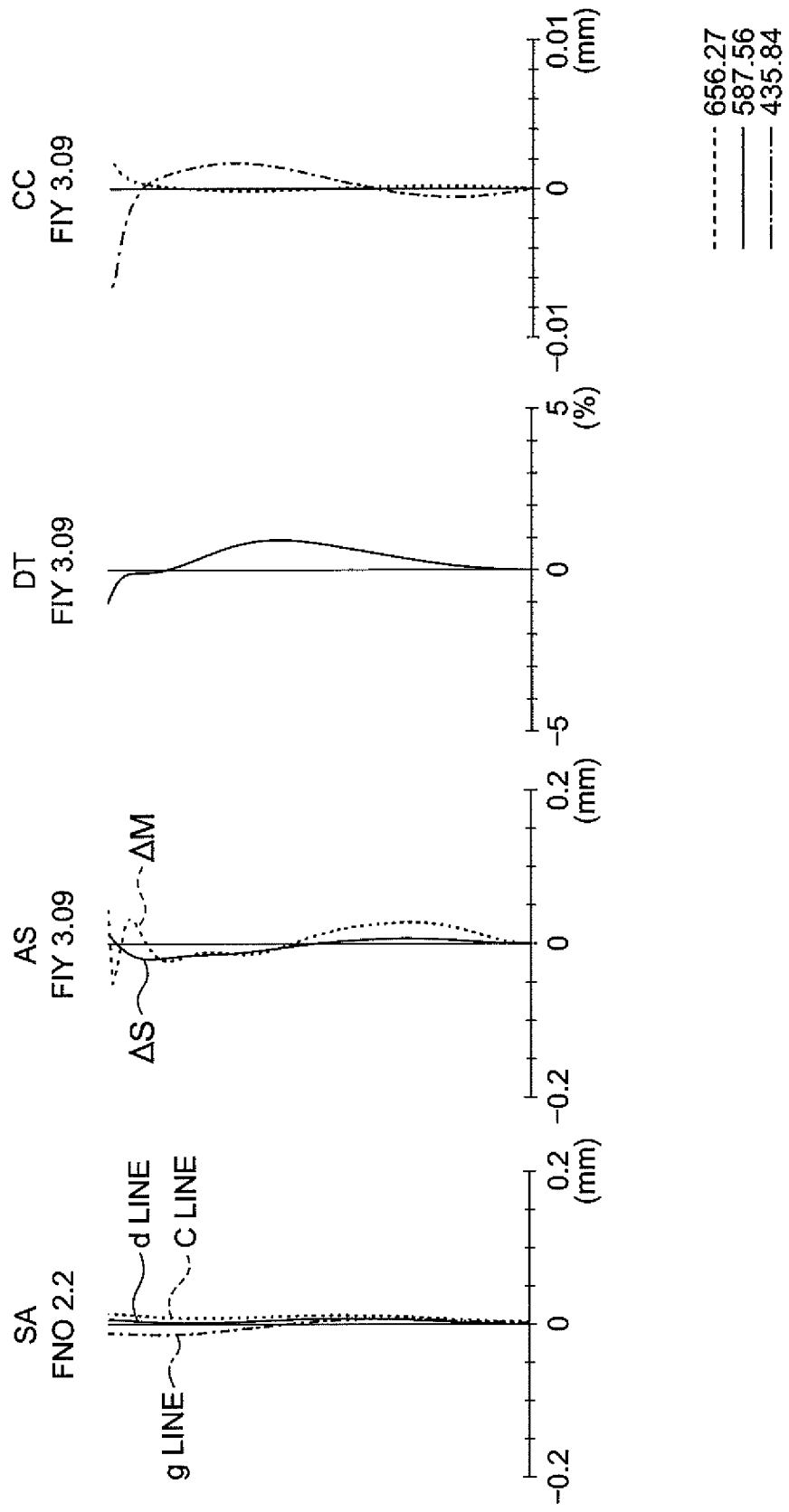
FIG. 13A, FIG. 13B, FIG. 13C, and FIG. 13D (hereinafter, 'FIG. 13A to FIG. 13D') are diagrams showing spherical aberration (SA), astigmatism (AS), distortion (DT), and chromatic aberration of magnification (CC) at the time of infinite object point focusing of the image pickup optical system according to the sixth example.

Next, an image pickup optical system according to a sixth example will be described below. FIG. 12 is a cross-sectional view along an optical axis showing an optical arrangement at the time of infinite object point focusing of the image pickup optical system according to the sixth example.

Moreover, FIG. 13A to FIG. 13D are aberration diagrams at the time of infinite object point focusing of the image pickup optical system according to the sixth example.

The image pickup optical system according to the sixth example, as shown in FIG. 12, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Figure 14:
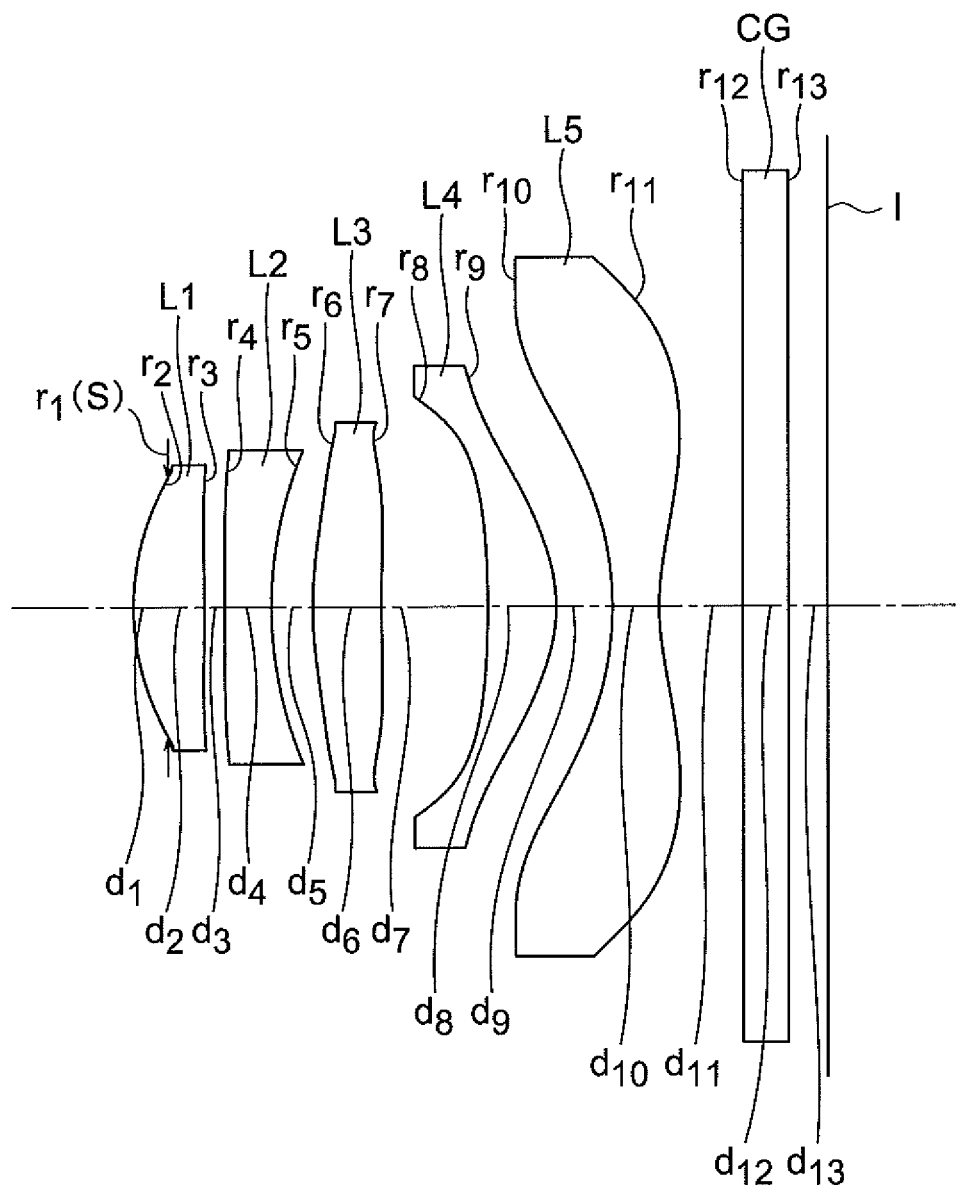
FIG. 14 is a cross-sectional view along an optical axis showing an optical arrangement at the time of infinite object point focusing of an image pickup optical system according to a seventh example of the present invention.
Figure 15:
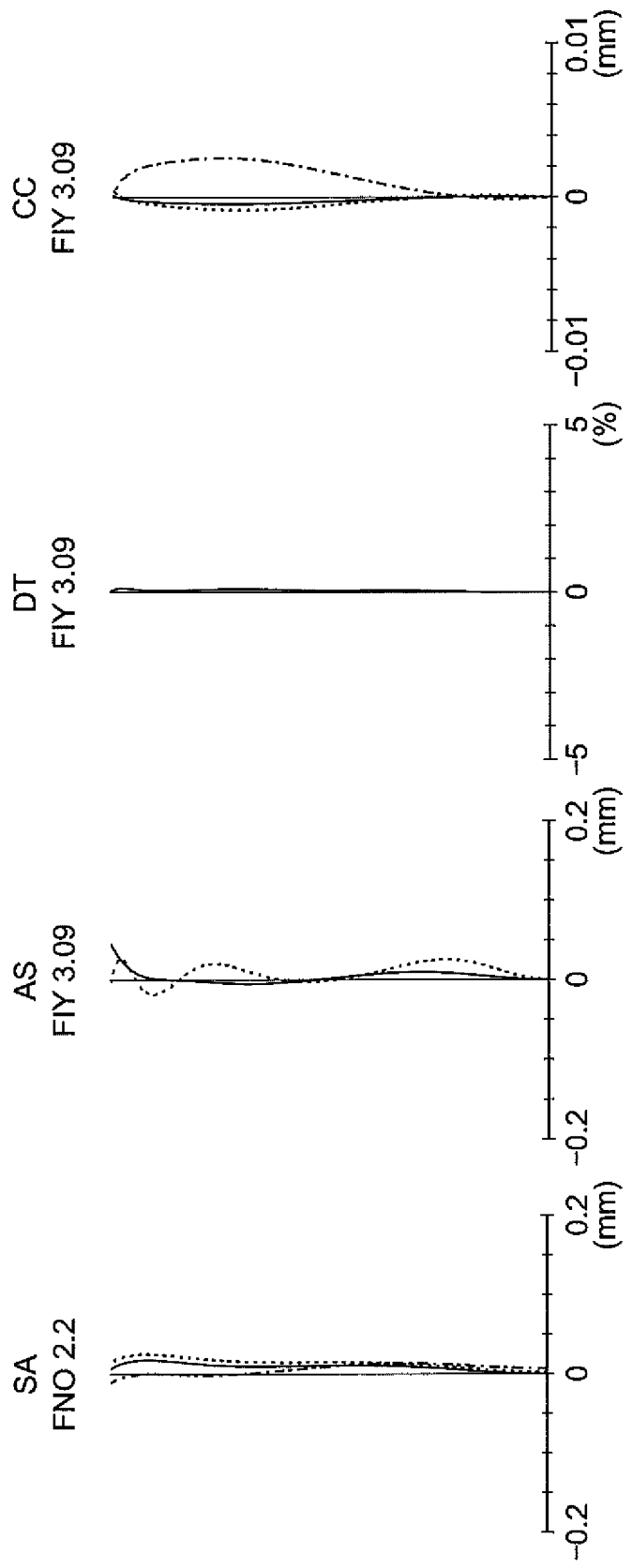
FIG. 15A, FIG. 15B, FIG. 15C, and FIG. 15D (hereinafter, 'FIG. 15A to FIG. 15D') are diagrams showing spherical aberration (SA), astigmatism (AS), distortion (DT), and chromatic aberration of magnification (CC) at the time of infinite object point focusing of the image pickup optical system according to the seventh example.

Next, an image pickup optical system according to a seventh example will be described below. FIG. 14 is a cross-sectional view along an optical axis showing an optical arrangement at the time of infinite object point focusing of the image pickup optical system according to the seventh example. Moreover, FIG. 15A to FIG. 15D are aberration diagrams at the time of infinite object point focusing of the image pickup optical system according to the seventh example.

The image pickup optical system according to the seventh example, as shown in FIG. 14, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Figure 16:
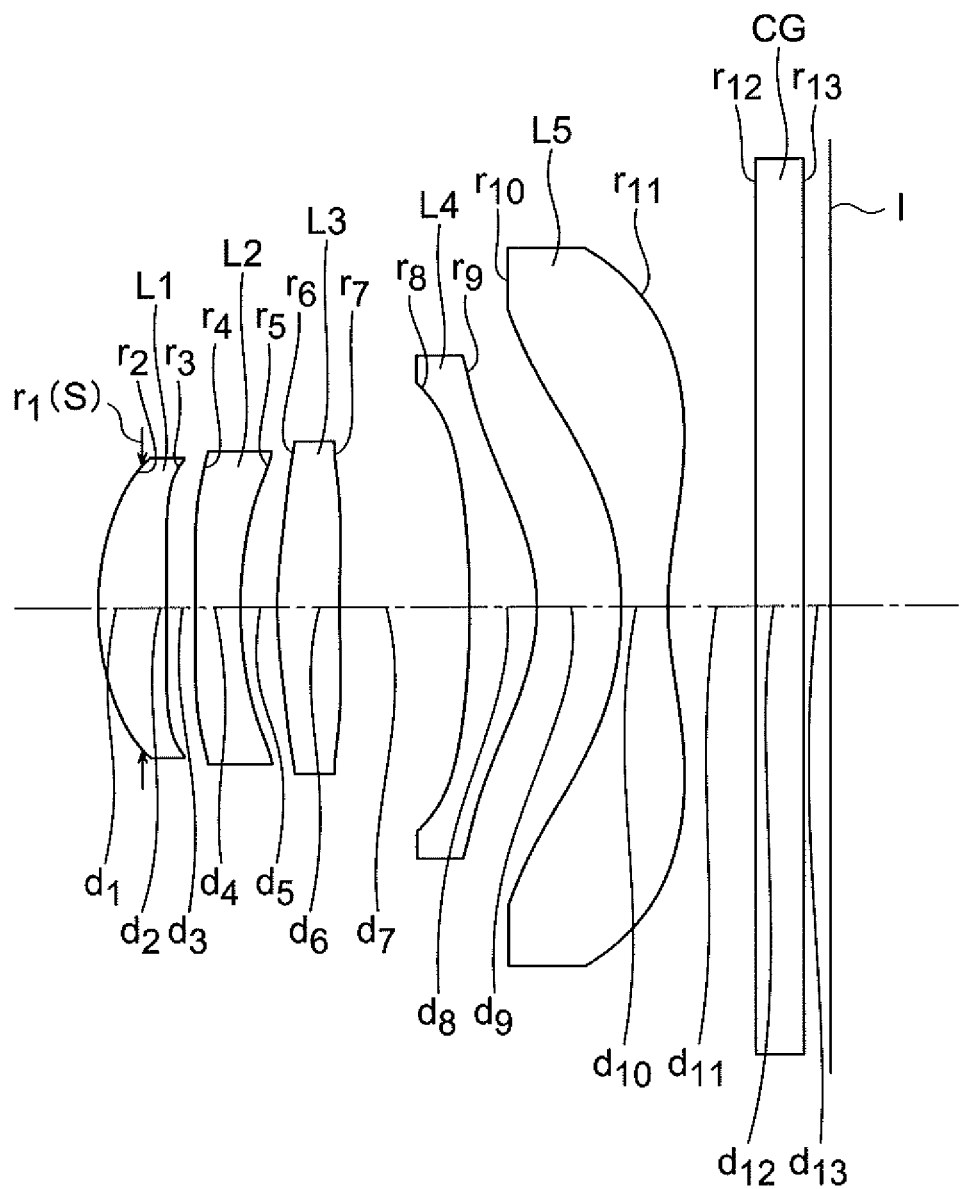
FIG. 16 is a cross-sectional view along an optical axis showing an optical arrangement at the time of infinite object point focusing of an image pickup optical system according to an eighth example of the present invention.
Figure 17:
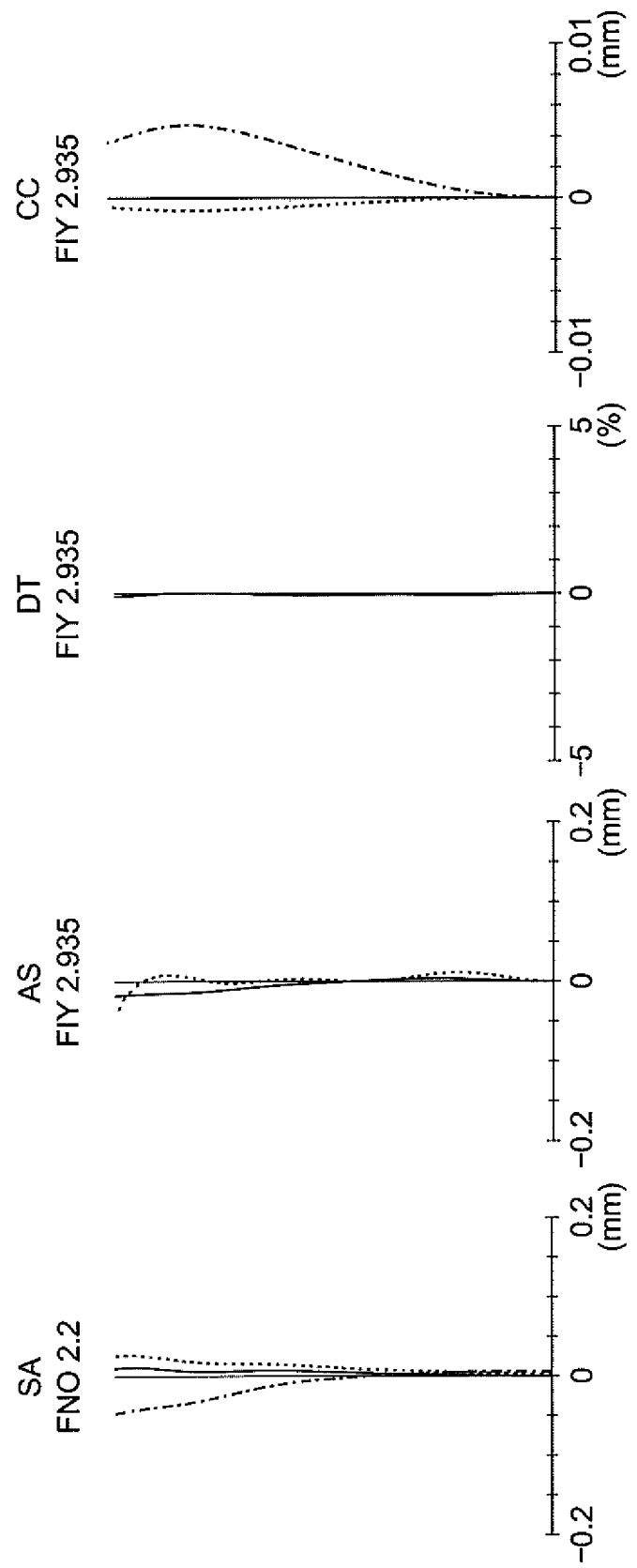
FIG. 17A, FIG. 17B, FIG. 17C, and FIG. 17D (hereinafter, 'FIG. 17A to FIG. 17D') are diagrams showing spherical aberration (SA), astigmatism (AS), distortion (DT), and chromatic aberration of magnification (CC) at the time of infinite object point focusing of the image pickup optical system according to the eighth example.

Next, an image pickup optical system according to an eighth example will be described below. FIG. 16 is a cross-sectional view along an optical axis showing an optical arrangement at the time of infinite object point focusing of the image pickup optical system according to the eighth example. Moreover, FIG. 17A to FIG. 17D are aberration diagrams at the time of infinite object point focusing of the image pickup optical system according to the eighth example.

The image pickup optical system according to the eight example, as shown in FIG. 16, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Figure 18:
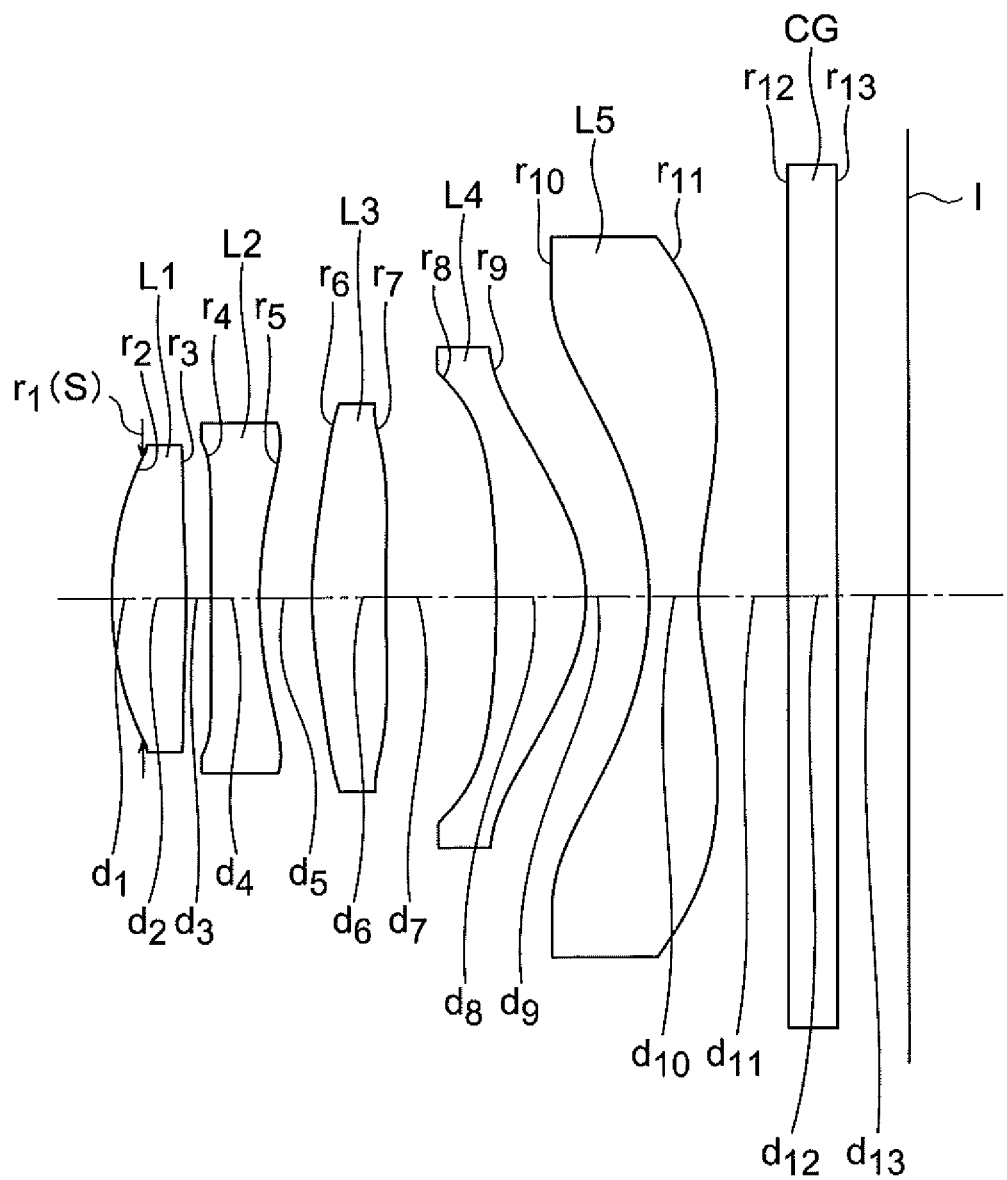
FIG. 18 is a cross-sectional view along an optical axis showing an optical arrangement at the time of infinite object point focusing of an image pickup optical system according to a ninth example of the present invention.
Figure 19:
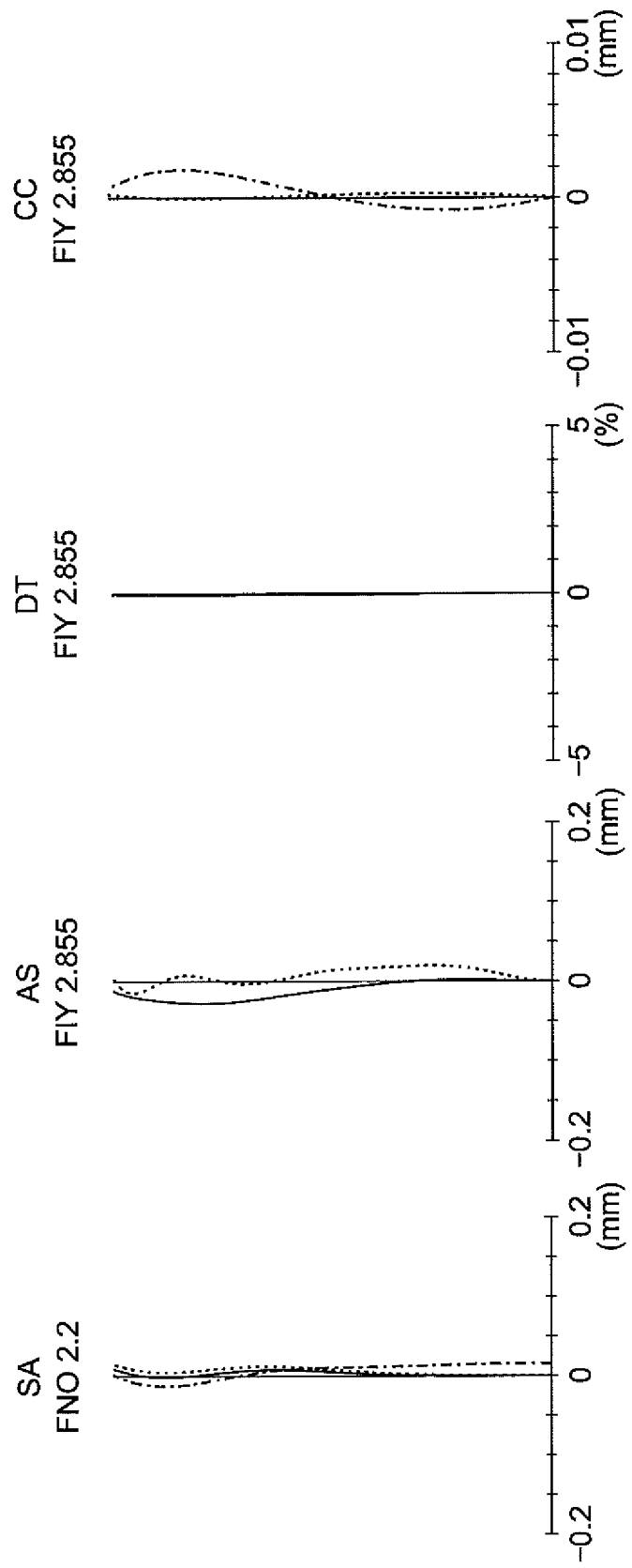
FIG. 19A, FIG. 19B, FIG. 19C, and FIG. 19D (hereinafter, 'FIG. 19A to FIG. 19D') are diagrams showing spherical aberration (SA), astigmatism (AS), distortion (DT), and chromatic aberration of magnification (CC) at the time of infinite object point focusing of the image pickup optical system according to the ninth example.

Next, an image pickup optical system according to a ninth example will be described below. FIG. 18 is a cross-sectional view along an optical axis showing an optical axial arrangement at the time of infinite object point focusing of the image pickup optical system according to the ninth example. Moreover, FIG. 19A to FIG. 19D are aberration diagrams at the time of infinite object point focusing of the image pickup optical system according to the ninth example.

The image pickup optical system according to the ninth example, as shown in FIG. 18, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Figure 20:
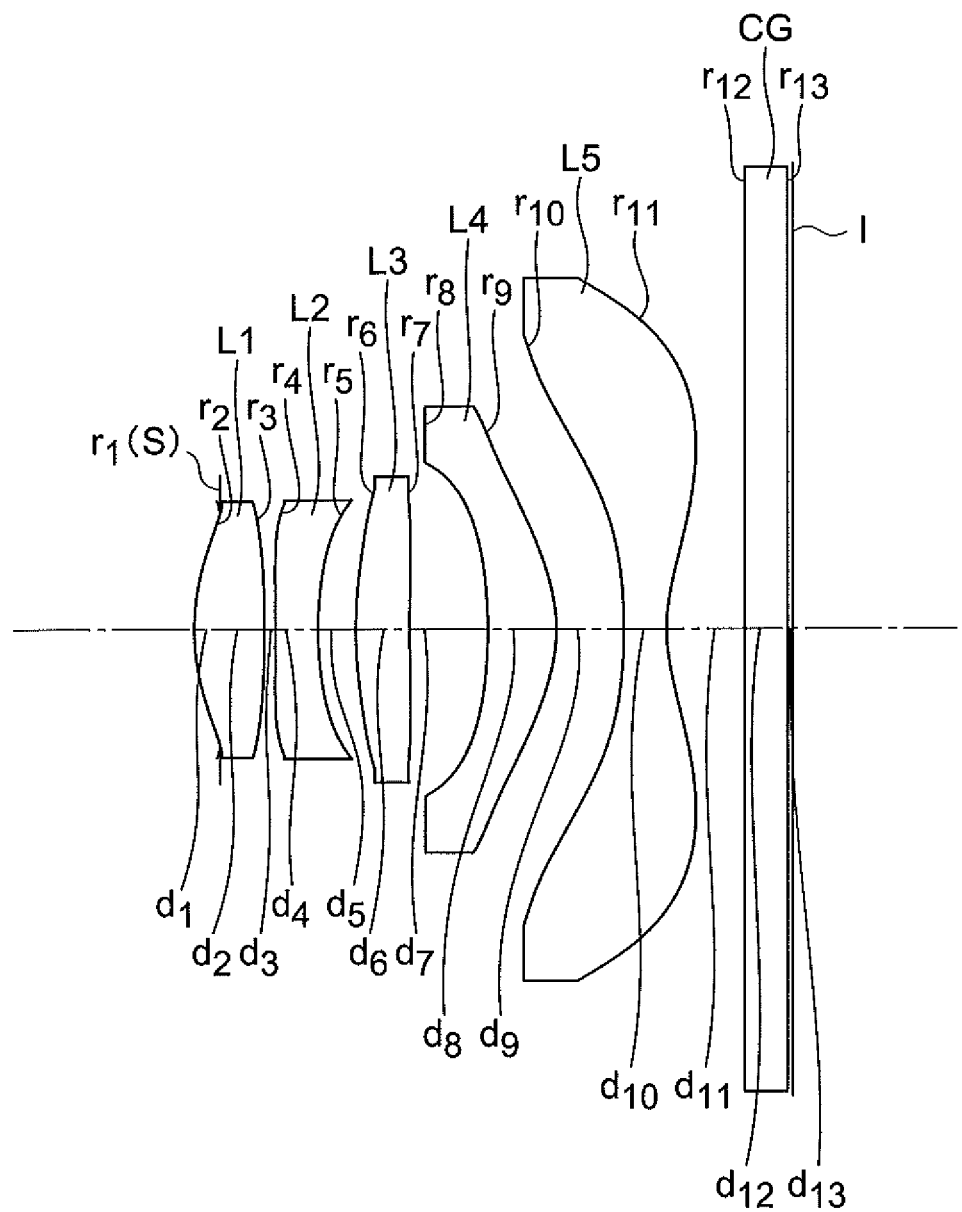
FIG. 20 is a cross-sectional view along an optical axis showing an optical arrangement at the time of infinite object point focusing of an image pickup optical system according to a tenth example of the present invention.
Figure 21:
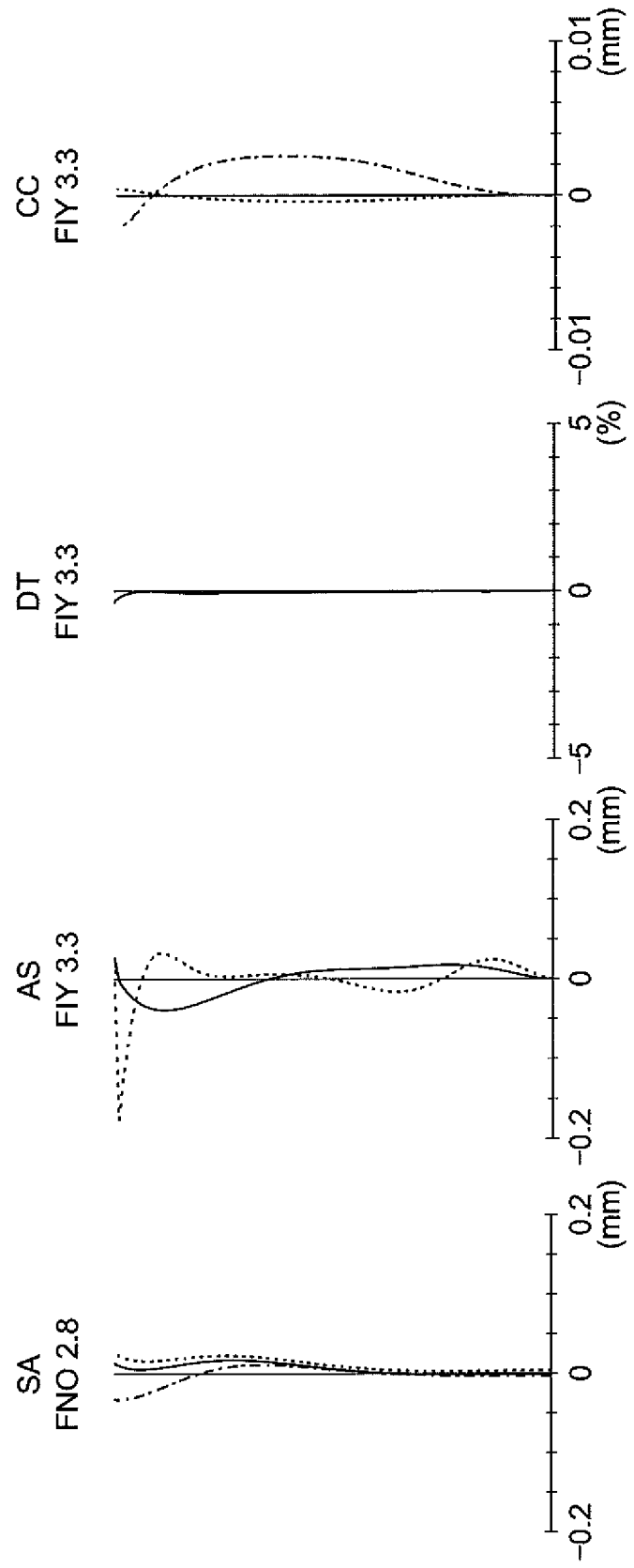
FIG. 21A, FIG. 21B, FIG. 21C, and FIG. 21D (hereinafter, 'FIG. 21A to FIG. 21D') are diagrams showing spherical aberration (SA), astigmatism (AS), distortion (DT), and chromatic aberration of magnification (CC) at the time of infinite object point focusing of the image pickup optical system according to the tenth example.

Next, an image pickup optical system according to a tenth example will be described below. FIG. 20 is a cross-sectional view along an optical axis showing an optical arrangement at the time of infinite object point focusing of the image pickup optical system according to the tenth example. Moreover, FIG. 21A to FIG. 21D are aberration diagrams at the time of infinite object point focusing of the image pickup optical system according to the tenth example.

The image pickup optical system according to the tenth example, as shown in FIG. 20, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Figure 22:
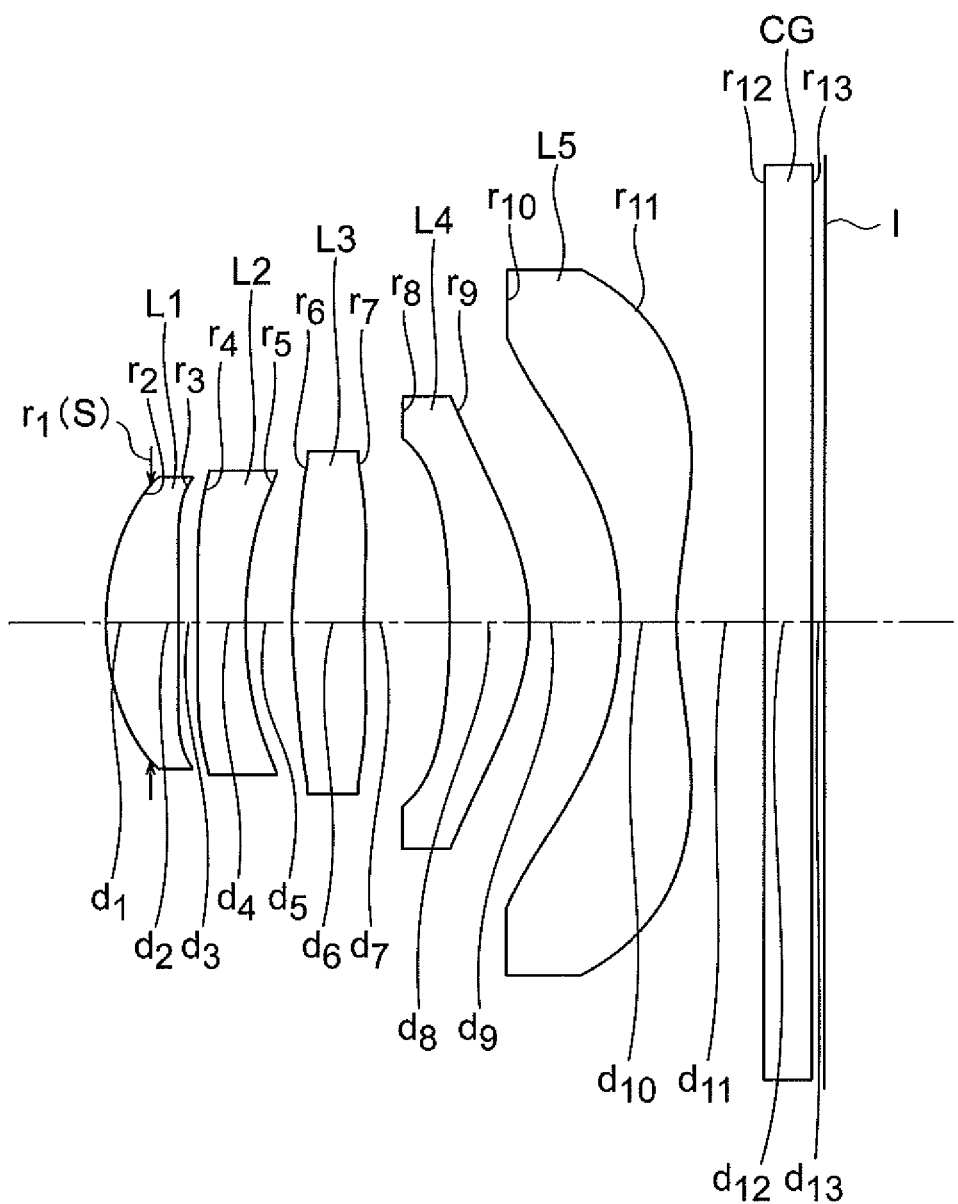
FIG. 22 is a cross-sectional view along an optical axis showing an optical arrangement at the time of infinite object point focusing of an image pickup optical system according to an eleventh example.
Figure 23:
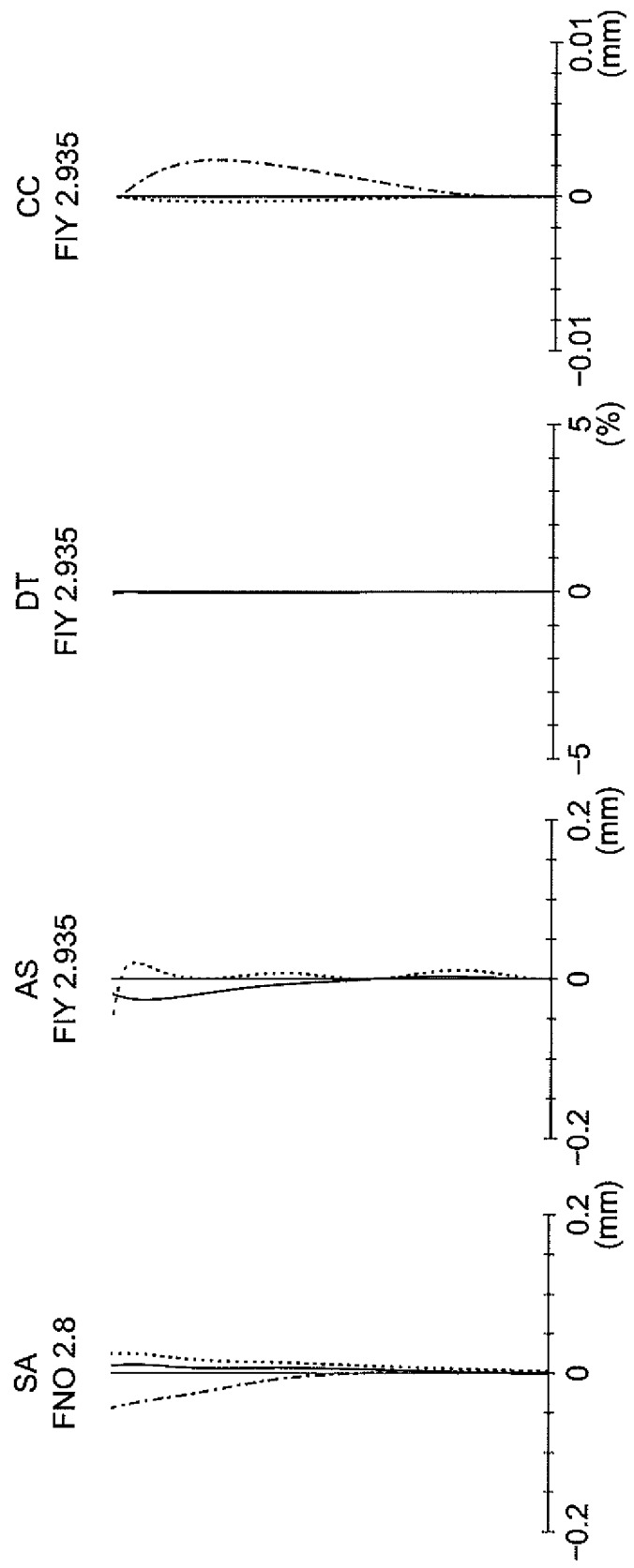
FIG. 23A, FIG. 23B, FIG. 23C, and FIG. 23D (hereinafter, 'FIG. 23A to FIG. 23D') are diagrams showing spherical aberration (SA), astigmatism (AS), distortion (DT), and chromatic aberration of magnification (CC) at the time of infinite object point focusing of the image pickup optical system according to the eleventh example.

Next, an image pickup optical system according to an eleventh example will be described below. FIG. 22 is a cross-sectional view along an optical axis showing an optical arrangement at the time of infinite object point focusing of the image pickup optical system according to the eleventh example. Moreover, FIG. 23A to FIG. 23D are aberration diagrams at the time of infinite object point focusing of the image pickup optical system according to the eleventh example.

The image pickup optical system according to the eleventh embodiment, as shown in FIG. 22, includes in order from an object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a planoconcave negative lens. The third lens L3 is a positive meniscus lens having a convex surface directed toward the object side. The fourth lens L4 is a positive meniscus lens having a convex surface directed toward an image side. The fifth lens L5 is a biconcave negative lens.

A lens surface on the image side of the third lens L3 has a shape such that a concave surface is directed toward the image side, near an optical axis, and a shape such that a convex surface is directed toward the image side, in a peripheral portion. Moreover, each of the lenses from the first lens L1 to the fifth lens L5 is formed of a resin.

An aspheric surface is provided to both surfaces of each of the lenses from the first lens L1 to the fifth lens L5.

Next, numerical data of optical components comprising the image pickup optical system of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, ν1, νd2, . . . stands for an Abbe number of each lens, * stands for an aspheric surface, focal length stands for a focal length of a total optical system, fb stands for a back focus. The total length is the distance from the frontmost lens surface to the rearmost lens surface plus back focus. Further, fb (back focus) is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, e stands for exponent of ten. These symbols are commonly used in the following numerical data for each example.

Example 1

Unit mm

Surface data

| Surface no. | r | d | nd | νd |
|---|---|---|---|---|
| Object plane | ∞ | ∞ | | |
| 1(stop) | ∞ | −0.20 | | |
| 2* | 1.669 | 0.51 | 1.53463 | 56.22 |
| 3* | −27.811 | 0.07 | | |
| 4* | 11.801 | 0.29 | 1.61417 | 25.64 |
| 5* | 2.160 | 0.31 | | |
| 6* | 2.422 | 0.35 | 1.53463 | 56.22 |
| 7* | 3.042 | 0.52 | | |
| 8* | −2.671 | 0.60 | 1.53463 | 56.22 |
| 9* | −0.909 | 0.12 | | |
| 10* | −31.972 | 0.67 | 1.53463 | 56.22 |
| 11* | 1.210 | 0.64 | | |

-continued

Unit mm

| | | | | |
|---|---|---|---|---|
| 12 | ∞ | 0.26 | 1.51633 | 64.14 |
| 13 | ∞ | 0.44 | | |
| Image plane | ∞ | | | |

Aspherical surface data

2nd surface k = −0.631
A4 = 2.05834e−02, A6 = −7.35673e−02, A8 = 1.12045e−01,
A10 = −1.30540e−01
3rd surface k = 1.000
A4 = −9.33740e−02, A6 = 2.45901e−01, A8 = −4.49784e−01,
A10 = 1.95140e−01
4th surface k = −501.082
A4 = −1.22336e−01, A6 = 4.62279e−01, A8 = −7.30892e−01,
A10 = 4.11977e−01
5th surface k = −16.322
A4 = 5.18777e−02, A6 = 1.40176e−01, A8 = −1.73096e−01,
A10 = 2.48997e−02, A12 = 6.15146e−02
6th surface k = −22.814
A4 = 2.78876e−02, A6 = −1.30236e−01, A8 = 1.05848e−01,
A10 = −3.56783e−02
7th surface k = −3.892
A4 = −3.88629e−02, A6 = −4.23099e−03, A8 = −2.70217e−02,
A10 = 2.38943e−02
8th surface k = −0.030
A4 = −4.61816e−03, A6 = 7.10804e−02, A8 = −1.35555e−02,
A10 = −3.41211e−02, A12 = 1.42784e−02
9th surface k = −3.219
A4 = −9.29026e−02, A6 = 7.40535e−02, A8 = 2.35225e−02,
A10 = −2.46308e−02, A12 = 4.16669e−03
10th surface k = −120.055
A4 = −3.76799e−02, A6 = 1.61016e−02, A8 = −1.38734e−03,
A10 = −2.37327e−04, A12 = 3.89792e−05, A14 = −1.48123e−06
11th surface k = −8.029
A4 = −6.00807e−02, A6 = 2.05355e−02, A8 = −5.25042e−03,
A10 = 7.62193e−04, A12 = −5.19898e−05, A14 = 8.77884e−07

| | |
|---|---|
| Focal length | 3.91 |
| fb (in air) | 1.25 |
| Lens total length (in air) | 4.68 |

Example 2

Unit mm

Surface data

| Surface no. | r | d | nd | vd |
|---|---|---|---|---|
| Object plane | ∞ | ∞ | | |
| 1(stop) | ∞ | −0.13 | | |
| 2* | 1.624 | 0.44 | 1.53463 | 56.22 |
| 3* | −10.854 | 0.04 | | |

-continued

Unit mm

| | | | | |
|---|---|---|---|---|
| 4* | −11.704 | 0.29 | 1.61417 | 25.64 |
| 5* | 2.607 | 0.14 | | |
| 6* | 2.885 | 0.33 | 1.53463 | 56.22 |
| 7* | 15.211 | 0.51 | | |
| 8* | −3.594 | 0.51 | 1.53463 | 56.22 |
| 9* | −0.810 | 0.26 | | |
| 10* | −4.467 | 0.40 | 1.53463 | 56.22 |
| 11* | 0.947 | 0.66 | | |
| 12 | ∞ | 0.26 | 1.51633 | 64.14 |
| 13 | ∞ | 0.12 | | |
| Image plane | ∞ | | | |

Aspherical surface data

2nd surface k = −1.490
A4 = 4.66035e−03, A6 = −6.85006e−02, A8 = 8.45794e−02,
A10 = −2.59615e−01
3rd surface k = −961.078
A4 = −1.31653e−01, A6 = 3.12074e−01, A8 = −6.87966e−01,
A10 = 3.70516e−01
4th surface k = −216.427
A4 = −1.86145e−02, A6 = 4.12857e−01, A8 = −9.29786e−01,
A10 = 7.42836e−01
5th surface k = −37.611
A4 = 1.71995e−01, A6 = 1.77317e−02, A8 = −8.71275e−02,
A10 = −6.78080e−02, A12 = 1.31241e−01
6th surface k = −45.023
A4 = 9.81686e−03, A6 = −1.42942e−01, A8 = 2.61722e−01,
A10 = −9.32263e−02
7th surface k = 0.372
A4 = −9.02348e−02, A6 = 7.20877e−03, A8 = −1.39391e−01,
A10 = 1.90676e−01
8th surface k = −9.757
A4 = −1.69979e−02, A6 = 1.52627e−02, A8 = −4.65208e−04,
A10 = −4.84153e−02, A12 = 2.17603e−02
9th surface k = −3.523
A4 = −6.36764e−02, A6 = 8.08352e−02, A8 = 2.37013e−02,
A10 = −3.18950e−02, A12 = 5.84446e−03
10h surface k = −84.623
A4 = −9.09268e−02, A6 = 3.72170e−02, A8 = −2.20901e−03,
A10 = −7.61442e−04, A12 = 2.06833e−05, A14 = 1.11766e−05
11th surface k = −7.295
A4 = −7.01678e−02, A6 = 2.94371e−02, A8 = −7.66693e−03,
A10 = 1.01067e−03, A12 = −5.13183e−05, A14 = −4.53051e−07

| | |
|---|---|
| Focal length | 3.16 |
| fb (in air) | 0.95 |
| Lens total length (in air) | 3.87 |

Example 3

Unit mm

Surface data

| Surface no. | r | d | nd | νd |
|---|---|---|---|---|
| Object plane | ∞ | ∞ | | |
| 1(stop) | ∞ | −0.15 | | |
| 2* | 1.717 | 0.46 | 1.53463 | 56.22 |
| 3* | −12.135 | 0.08 | | |
| 4* | −13.215 | 0.29 | 1.61417 | 25.64 |
| 5* | 2.794 | 0.19 | | |
| 6* | 2.996 | 0.33 | 1.53463 | 56.22 |
| 7* | 8.820 | 0.56 | | |
| 8* | −3.630 | 0.59 | 1.53463 | 56.22 |
| 9* | −0.842 | 0.32 | | |
| 10* | −4.478 | 0.32 | 1.53463 | 56.22 |
| 11* | 1.055 | 0.66 | | |
| 12 | ∞ | 0.26 | 1.51633 | 64.14 |
| 13 | ∞ | 0.23 | | |
| Image plane | ∞ | | | |

Aspherical surface data

2nd surface $k = -1.213$
$A4 = 7.21903e-03, A6 = -5.40404e-02, A8 = 1.13165e-01,$
$A10 = -1.96040e-01$
3rd surface $k = -1000.025$
$A4 = -9.95790e-02, A6 = 3.18616e-01, A8 = -6.81243e-01,$
$A10 = 3.40892e-01$
4th surface $k = -210.788$
$A4 = -2.17214e-02, A6 = 4.20502e-01, A8 = -9.59074e-01,$
$A10 = 6.36908e-01$
5th surface $k = -40.375$
$A4 = 1.45141e-01, A6 = 1.00500e-02, A8 = -7.71323e-02,$
$A10 = -6.08204e-02, A12 = 8.94124e-02$
6th surface $k = -48.900$
$A4 = 1.06185e-02, A6 = -1.64984e-01, A8 = 2.26747e-01,$
$A10 = -7.04192e-02$
7th surface $k = -18.464$
$A4 = -9.23648e-02, A6 = 2.87199e-02, A8 = -1.24218e-01,$
$A10 = 1.23780e-01$
8th surface $k = -2.391$
$A4 = -3.91080e-02, A6 = 3.78241e-02, A8 = 2.74447e-03,$
$A10 = -4.62227e-02, A12 = 1.89155e-02$
9th surface $k = -3.190$
$A4 = -7.47320e-02, A6 = 4.30769e-02, A8 = 3.87994e-02,$
$A10 = -2.75671e-02, A12 = 4.19073e-03$
10h surface $k = -55.727$
$A4 = -6.54007e-02, A6 = 2.36155e-02, A8 = -1.12027e-03,$
$A10 = -4.31371e-04, A12 = 1.14891e-05, A14 = 4.09135e-06$
11h surface $k = -7.702$
$A4 = -6.55860e-02, A6 = 2.55750e-02, A8 = -6.89912e-03,$
$A10 = 1.01641e-03, A12 = -6.70305e-05, A14 = 6.38693e-07$

| | |
|---|---|
| Focal length | 3.46 |
| fb (in air) | 1.06 |
| Lens total length (in air) | 4.21 |

Example 4

Unit mm

Surface data

| Surface no. | r | d | nd | νd |
|---|---|---|---|---|
| Object plane | ∞ | ∞ | | |
| 1 (stop) | ∞ | −0.13 | | |
| 2* | 1.624 | 0.44 | 1.53463 | 56.22 |
| 3* | −10.854 | 0.04 | | |
| 4* | −11.704 | 0.29 | 1.61417 | 25.64 |
| 5* | 2.607 | 0.14 | | |
| 6* | 2.885 | 0.33 | 1.53463 | 56.22 |
| 7* | 15.211 | 0.51 | | |
| 8* | −3.594 | 0.51 | 1.53463 | 56.22 |
| 9* | −0.810 | 0.26 | | |
| 10* | −4.467 | 0.40 | 1.53463 | 56.22 |
| 11* | 0.947 | 0.66 | | |
| 12 | ∞ | 0.26 | 1.51633 | 64.14 |
| 13 | ∞ | 0.12 | | |
| Image plane | ∞ | | | |

Aspherical surface data

2nd surface $k = -1.490$
$A4 = 4.66035e-03, A6 = -6.85006e-02, A8 = 8.45794e-02,$
$A10 = -2.59615e-01$
3rd surface $k = -961.078$
$A4 = -1.31653e-01, A6 = 3.12074e-01, A8 = -6.87966e-01,$
$A10 = 3.70516e-01$
4th surface $k = -216.427$
$A4 = -1.86145e-02, A6 = 4.12857e-01, A8 = -9.29786e-01,$
$A10 = 7.42836e-01$
5th surface $k = -37.611$
$A4 = 1.71995e-01, A6 = 1.77317e-02, A8 = -8.71275e-02,$
$A10 = -6.78080e-02, A12 = 1.31241e-01$
6th surface $k = -45.023$
$A4 = 9.81686e-03, A6 = -1.42942e-01, A8 = 2.61722e-01,$
$A10 = -9.32263e-02$
7th surface $k = 0.372$
$A4 = -9.02348e-02, A6 = 7.20877e-03, A8 = -1.39391e-01,$
$A10 = 1.90676e-01$
8th surface $k = -9.757$
$A4 = -1.69979e-02, A6 = 1.52627e-02, A8 = -4.65208e-04,$
$A10 = -4.84153e-02, A12 = 2.17603e-02$
9th surface $k = -3.523$
$A4 = -6.36764e-02, A6 = 8.08352e-02, A8 = 2.37013e-02,$
$A10 = -3.18950e-02, A12 = 5.84446e-03$
10th surface $k = -84.623$
$A4 = -9.09268e-02, A6 = 3.72170e-02, A8 = -2.20901e-03,$
$A10 = -7.61442e-04, A12 = 2.06833e-05, A14 = 1.11766e-05$
11th surface $k = -7.295$
$A4 = -7.01678e-02, A6 = 2.94371e-02, A8 = -7.66693e-03,$
$A10 = 1.01067e-03, A12 = -5.13183e-05, A14 = -4.53051e-07$

| | |
|---|---|
| Focal length | 3.16 |
| fb (in air) | 0.95 |
| Lens total length (in air) | 3.87 |

Example 5

Unit mm

Surface data

| Surface no. | r | d | nd | νd |
|---|---|---|---|---|
| Object plane | ∞ | ∞ | | |
| 1 (stop) | ∞ | 0.12 | | |
| 2* | 1.585 | 0.41 | 1.53463 | 56.22 |
| 3* | −10.824 | 0.06 | | |
| 4* | −13.034 | 0.27 | 1.61417 | 25.64 |
| 5* | 2.555 | 0.15 | | |
| 6* | 2.867 | 0.33 | 1.53463 | 56.22 |
| 7* | 12.458 | 0.55 | | |
| 8* | −4.876 | 0.45 | 1.53463 | 56.22 |
| 9* | −0.860 | 0.32 | | |
| 10* | −3.612 | 0.32 | 1.53463 | 56.22 |
| 11* | 1.011 | 0.50 | | |
| 12 | ∞ | 0.26 | 1.51633 | 64.14 |
| 13 | ∞ | 0.15 | | |
| Image plane | ∞ | | | |

Aspherical surface data

2nd surface $k = -1.073$
$A4 = 8.76209e-03, A6 = -7.25425e-02, A8 = 6.10672e-02,$
$A10 = -2.51086e-01$
3rd surface $k = -1000.001$
$A4 = -1.12976e-01, A6 = 2.79879e-01, A8 = -7.13697e-01,$
$A10 = 3.77493e-01$
4th surface $k = -130.429$
$A4 = -2.31373e-02, A6 = 4.04022e-01, A8 = -9.44659e-01,$
$A10 = 7.63108e-01$
5th surface $k = -34.882$
$A4 = 1.49784e-01, A6 = 2.11604e-02, A8 = -7.41582e-02,$
$A10 = -6.40844e-02, A12 = 1.04104e-01$
6th surface $k = -52.517$
$A4 = 7.38904e-03, A6 = -1.57116e-01, A8 = 2.43176e-01,$
$A10 = -8.85103e-02$
7th surface $k = -233.333$
$A4 = -9.77744e-02, A6 = 3.08571e-02, A8 = -1.36299e-01,$
$A10 = 1.68079e-01$
8th surface $k = 0.046$
$A4 = -4.32704e-02, A6 = 2.68741e-02, A8 = 3.89143e-03,$
$A10 = -4.89829e-02, A12 = 2.03943e-02$
9th surface $k = -3.342$
$A4 = -6.43478e-02, A6 = 5.24999e-02, A8 = 3.55710e-02,$
$A10 = -3.00506e-02, A12 = 4.50924e-03$
10th surface $k = -23.956$
$A4 = -7.41601e-02, A6 = 2.80861e-02, A8 = -1.41471e-03,$
$A10 = -6.20790e-04, A12 = 5.87399e-06, A14 = 8.77005e-06$
11th surface $k = -7.942$
$A4 = -6.68442e-02, A6 = 2.74957e-02, A8 = -7.35357e-03,$
$A10 = 9.59897e-04, A12 = -4.95328e-05, A14 = -6.25941e-07$

| Focal length | 3.00 |
|---|---|
| fb (in air) | 0.82 |
| Lens total length (in air) | 3.69 |

Example 6

Unit mm

Surface data

| Surface no. | r | d | nd | νd |
|---|---|---|---|---|
| Object plane | ∞ | ∞ | | |
| 1 (stop) | ∞ | −0.22 | | |
| 2* | 1.800 | 0.48 | 1.53048 | 55.71 |
| 3* | −14.276 | 0.12 | | |
| 4* | ∞ | 0.30 | 1.63415 | 23.96 |
| 5* | 2.507 | 0.32 | | |
| 6* | 3.034 | 0.42 | 1.53048 | 55.71 |
| 7* | 8.897 | 0.64 | | |
| 8* | −8.753 | 0.52 | 1.53048 | 55.71 |
| 9* | −1.100 | 0.40 | | |
| 10* | −2.340 | 0.31 | 1.53048 | 55.71 |
| 11* | 1.690 | 0.55 | | |
| 12 | ∞ | 0.30 | 1.51633 | 64.14 |
| 13 | ∞ | 0.22 | | |
| Image plane | ∞ | | | |

Aspherical surface data

2nd surface $k = -0.067$
$A4 = -3.50455e-04, A6 = 8.68103e-04, A8 = 8.13173e-03,$
$A10 = 5.69973e-03$
3rd surface $k = 0.000$
$A4 = 8.62722e-03, A6 = 1.34334e-01, A8 = -1.87210e-01,$
$A10 = 1.01351e-01$
4th surface $k = 0.000$
$A4 = -5.94061e-02, A6 = 3.07008e-01, A8 = -4.35985e-01,$
$A10 = 2.06172e-01$
5th surface $k = -17.833$
$A4 = 1.09434e-02, A6 = 1.59267e-01, A8 = -2.14241e-01,$
$A10 = 7.38729e-02, A12 = 7.20984e-03$
6th surface $k = -42.997$
$A4 = 2.22929e-02, A6 = -1.30598e-01, A8 = 1.26249e-01,$
$A10 = -3.38963e-02, A12 = -3.04189e-03$
7th surface $k = -0.996$
$A4 = -9.07469e-02, A6 = 2.63975e-02, A8 = -5.99227e-02,$
$A10 = 4.26996e-02, A12 = -1.44670e-03$
8th surface $k = 0.000$
$A4 = -4.69184e-02, A6 = 4.17564e-03, A8 = 1.75578e-02,$
$A10 = -2.83279e-02, A12 = 7.97082e-03$
9th surface $k = -4.100$
$A4 = -9.99272e-02, A6 = 7.52981e-02, A8 = -2.13141e-02,$
$A10 = 4.10666e-03, A12 = -5.47711e-04$
10th surface $k = -6.580$
$A4 = -7.55503e-02, A6 = 2.32771e-02, A8 = 3.40373e-04,$
$A10 = -7.79850e-04, A12 = 9.01527e-05, A14 = -2.69832e-06$
11th surface $k = -12.889$
$A4 = -6.87856e-02, A6 = 2.63312e-02, A8 = -8.77805e-03,$
$A10 = 1.73350e-03, A12 = -2.05936e-04, A14 = 1.14642e-05$

| Half angel of view | 39.8 |
|---|---|
| Focal length | 3.74 |

-continued

Unit mm

| | |
|---|---|
| fb (in air) | 0.97 |
| Lens total length (in air) | 4.47 |

Example 7

Unit mm

Surface data

| Surface no. | r | d | nd | vd |
|---|---|---|---|---|
| Object plane | ∞ | ∞ | | |
| 1 (stop) | ∞ | −0.22 | | |
| 2* | 1.823 | 0.46 | 1.53048 | 55.71 |
| 3* | −18.910 | 0.14 | | |
| 4* | ∞ | 0.30 | 1.63415 | 23.96 |
| 5* | 2.391 | 0.27 | | |
| 6* | 2.565 | 0.46 | 1.53048 | 55.71 |
| 7* | 10.769 | 0.70 | | |
| 8* | −7.435 | 0.45 | 1.53048 | 55.71 |
| 9* | −1.107 | 0.37 | | |
| 10* | −2.187 | 0.31 | 1.53048 | 55.71 |
| 11* | 1.650 | 0.55 | | |
| 12 | ∞ | 0.30 | 1.51633 | 64.14 |
| 13 | ∞ | 0.26 | | |
| Image plane | ∞ | | | |

Aspherical surface data

2nd surface $k = -0.026$
$A4 = 2.12528e-03, A6 = -1.70976e-03, A8 = 3.36107e-03,$
$A10 = -1.13367e-03$
3rd surface $k = 0.000$
$A4 = 1.25153e-02, A6 = 1.35944e-01, A8 = -1.94045e-01,$
$A10 = 8.74649e-02$
4th surface $k = 0.000$
$A4 = -5.53431e-02, A6 = 3.15721e-01, A8 = -4.32922e-01,$
$A10 = 1.98269e-01$
5th surface $k = -18.600$
$A4 = 1.16418e-02, A6 = 1.66793e-01, A8 = -2.05987e-01,$
$A10 = 7.69319e-02, A12 = 1.61737e-03$
6th surface $k = -32.522$
$A4 = 3.51560e-02, A6 = -1.28433e-01, A8 = 1.24902e-01,$
$A10 = -3.43110e-02, A12 = -1.10491e-03$
7th surface $k = 1.661$
$A4 = -9.03413e-02, A6 = 2.92763e-02, A8 = -5.91969e-02,$
$A10 = 4.20709e-02, A12 = -2.16715e-03$
8th surface $k = 0.000$
$A4 = -4.79186e-02, A6 = -7.43705e-04, A8 = 1.57914e-02,$
$A10 = -2.85907e-02, A12 = 8.09489e-03$
9th surface $k = -4.519$
$A4 = -9.75737e-02, A6 = 7.48277e-02, A8 = -2.14032e-02,$
$A10 = 4.11549e-03, A12 = -5.32144e-04$
10th surface $k = -6.471$
$A4 = -7.49255e-02, A6 = 2.33301e-02, A8 = 3.42532e-04,$
$A10 = -7.80588e-04, A12 = 8.97567e-05, A14 = -2.84149e-06$ -continued Unit mm 11th surface $k = -13.814$
$A4 = -7.02329e-02, A6 = 2.64395e-02, A8 = -8.74225e-03,$
$A10 = 1.73650e-03, A12 = -2.06110e-04, A14 = 1.13477e-05$

| | |
|---|---|
| Half angel of view | 38.8 |
| Focal length | 3.85 |
| fb (in air) | 1.00 |
| Lens total length (in air) | 4.47 |

Example 8

Unit mm

Surface data

| Surface no. | r | d | nd | vd |
|---|---|---|---|---|
| Object plane | ∞ | ∞ | | |
| 1 (stop) | ∞ | −0.28 | | |
| 2* | 1.763 | 0.42 | 1.53048 | 55.71 |
| 3* | −70.382 | 0.18 | | |
| 4* | ∞ | 0.28 | 1.63415 | 23.96 |
| 5* | 2.440 | 0.23 | | |
| 6* | 2.560 | 0.39 | 1.53048 | 55.71 |
| 7* | 10.768 | 0.81 | | |
| 8* | −6.196 | 0.42 | 1.53048 | 55.71 |
| 9* | −1.290 | 0.52 | | |
| 10* | −2.256 | 0.29 | 1.53048 | 55.71 |
| 11* | 1.961 | 0.55 | | |
| 12 | ∞ | 0.30 | 1.51633 | 64.14 |
| 13 | ∞ | 0.17 | | |
| Image plane | ∞ | | | |

Aspherical surface data

2nd surface $k = -0.030$
$A4 = -9.31991e-03, A6 = 3.12876e-02, A8 = -3.97384e-02,$
$A10 = 7.92459e-02$
3rd surface $k = 0.000$
$A4 = 1.50380e-02, A6 = 1.70570e-01, A8 = -1.63996e-01,$
$A10 = 1.57748e-01$
4th surface $k = 0.000$
$A4 = -1.72200e-02, A6 = 3.49432e-01, A8 = -3.58894e-01,$
$A10 = 1.06514e-01$
5th surface $k = -22.077$
$A4 = 2.89900e-02, A6 = 2.38100e-01, A8 = -2.11742e-01,$
$A10 = 1.39442e-02, A12 = -2.79762e-03$
6th surface $k = -31.260$
$A4 = -1.61576e-02, A6 = -1.05530e-01, A8 = 1.52117e-01,$
$A10 = 5.66068e-03, A12 = -4.86789e-02$
7th surface $k = -170.624$
$A4 = -9.56875e-02, A6 = 1.77768e-02, A8 = -5.06547e-02,$
$A10 = 7.21840e-02, A12 = -1.19626e-02$
8th surface $k = 0.000$
$A4 = 1.09936e-02, A6 = -3.49514e-02, A8 = 2.98815e-02,$
$A10 = -2.12430e-02, A12 = 4.55102e-03$ -continued

| Unit mm |
|---|
| 9th surface | k = −5.240
A4 = −6.49492e−02, A6 = 7.11477e−02, A8 = −2.32922e−02,
A10 = 3.82031e−03, A12 = −4.18025e−04
10th surface k = −3.190
A4 = −7.03145e−02, A6 = 2.40238e−02, A8 = 2.28365e−04,
A10 = −8.24963e−04, A12 = 8.57657e−05, A14 = −2.79989e−06
11th surface k = −17.470
A4 = −7.36295e−02, A6 = 2.72187e−02, A8 = −8.65030e−03,
A10 = 1.73042e−03, A12 = −2.09700e−04, A14 = 1.08011e−05

| | |
|---|---|
| Half angel of view | 36.3 |
| Focal length | 4.00 |
| fb (in air) | 0.91 |
| Lens total length (in air) | 4.47 |

Example 9

| Unit mm | | | | |
|---|---|---|---|---|
| Surface data | | | | |
| Surface no. | r | d | nd | vd |
| Object plane | ∞ | ∞ | | |
| 1 (stop) | ∞ | −0.19 | | |
| 2* | 2.265 | 0.46 | 1.53048 | 55.71 |
| 3* | −7.815 | 0.15 | | |
| 4* | ∞ | 0.30 | 1.63415 | 23.96 |
| 5* | 2.313 | 0.32 | | |
| 6* | 2.565 | 0.45 | 1.53048 | 55.71 |
| 7* | 10.768 | 0.68 | | |
| 8* | −9.330 | 0.55 | 1.53048 | 55.71 |
| 9* | −1.075 | 0.39 | | |
| 10* | −2.147 | 0.30 | 1.53048 | 55.71 |
| 11* | 1.896 | 0.55 | | |
| 12 | ∞ | 0.30 | 1.51633 | 64.14 |
| 13 | ∞ | 0.44 | | |
| Image plane | ∞ | | | |

| Aspherical surface data |
|---|
| 2nd surface | k = 0.067
A4 = 6.22689e−03, A6 = 1.00217e−02, A8 = −1.03713e−04,
A10 = 7.13189e−04
3rd surface k = 0.000
A4 = 2.57374e−02, A6 = 1.59908e−01, A8 = −2.11896e−01,
A10 = 6.13119e−02
4th surface k = 0.000
A4 = −9.19699e−02, A6 = 3.27238e−01, A8 = −4.04625e−01,
A10 = 1.02229e−01
5th surface k = −19.272
A4 = −1.64795e−02, A6 = 1.46338e−01, A8 = −2.05354e−01,
A10 = 7.45224e−02, A12 = −1.13963e−02
6th surface k = −29.871
A4 = 3.50064e−02, A6 = −1.26351e−01, A8 = 1.21703e−01,
A10 = −3.60419e−02, A12 = 1.53360e−03

-continued

| Unit mm |
|---|
| 7th surface | k = −15.448
A4 = −9.10170e−02, A6 = 2.80349e−02, A8 = −6.18284e−02,
A10 = 4.12870e−02, A12 = −1.52245e−03
8th surface k = 0.000
A4 = −4.24855e−02, A6 = 1.13239e−03, A8 = 1.87840e−02,
A10 = −2.76789e−02, A12 = 7.77980e−03
9th surface k = −3.858
A4 = −9.69825e−02, A6 = 7.57960e−02, A8 = −2.10361e−02,
A10 = 4.21519e−03, A12 = −5.15564e−04
10th surface k = −7.054
A4 = −7.41543e−02, A6 = 2.34448e−02, A8 = 3.61515e−04,
A10 = −7.77666e−04, A12 = 9.00354e−05, A14 = −2.85599e−06
11th surface k = −15.885
A4 = −7.03423e−02, A6 = 2.70188e−02, A8 = −8.65997e−03,
A10 = 1.74296e−03, A12 = −2.06315e−04, A14 = 1.11274e−05

| | |
|---|---|
| Half angel of view | 36.2 |
| Focal length | 3.90 |
| fb (in air) | 1.19 |
| Lens total length (in air) | 4.80 |

Example 10

| Unit mm | | | | |
|---|---|---|---|---|
| Surface data | | | | |
| Surface no. | r | d | nd | vd |
| Object plane | ∞ | ∞ | | |
| 1 (stop) | ∞ | −0.18 | | |
| 2* | 1.658 | 0.49 | 1.53048 | 55.71 |
| 3* | −10.001 | 0.08 | | |
| 4* | ∞ | 0.30 | 1.63415 | 23.96 |
| 5* | 2.509 | 0.27 | | |
| 6* | 2.878 | 0.38 | 1.53048 | 55.71 |
| 7* | 10.768 | 0.55 | | |
| 8* | −3.464 | 0.48 | 1.53048 | 55.71 |
| 9* | −1.197 | 0.48 | | |
| 10* | −4.000 | 0.30 | 1.53048 | 55.71 |
| 11* | 1.250 | 0.55 | | |
| 12* | ∞ | 0.30 | 1.51633 | 64.14 |
| 13* | ∞ | 0.04 | | |
| Image plane | ∞ | | | |

| Aspherical surface data |
|---|
| 2nd surface | k = −0.604
A4 = −7.64923e−03, A6 = −6.61202e−02, A8 = −3.82529e−02,
A10 = 3.62983e−03
3rd surface k = 0.000
A4 = −9.76822e−02, A6 = 1.66073e−01, A8 = −1.97831e−01,
A10 = 7.57434e−02
4th surface k = 0.000
A4 = −8.85508e−02, A6 = 4.22964e−01, A8 = −3.59857e−01,
A10 = 1.48005e−01

-continued

| Unit mm |
|---|

5th surface k = −19.882
A4 = 8.01115e−02, A6 = 1.72200e−01, A8 = −1.83215e−01,
A10 = 1.29753e−01, A12 = −3.02117e−02

6th surface k = −31.766
A4 = 3.06089e−02, A6 = −8.61840e−02, A8 = 1.24178e−01,
A10 = −5.67157e−02, A12 = 1.18947e−02

7th surface k = 36.593
A4 = −8.35223e−02, A6 = 4.26093e−02, A8 = −6.92873e−02,
A10 = 5.44965e−02, A12 = −4.09131e−03

8th surface k = 0.000
A4 = −2.29140e−02, A6 = −5.16946e−02, A8 = 3.35788e−02,
A10 = −1.97439e−02, A12 = −4.94338e−03

9th surface k = −6.269
A4 = −9.67204e−02, A6 = 7.41646e−02, A8 = −2.22276e−02,
A10 = 3.92060e−03, A12 = −5.56978e−04

10th surface k = 0.264
A4 = −7.70196e−02, A6 = 2.35650e−02, A8 = 3.70749e−04,
A10 = −7.90110e−04, A12 = 8.71061e−05, A14 = −2.26503e−06

11th surface k = −8.819
A4 = −7.18921e−02, A6 = 2.68757e−02, A8 = −8.85859e−03,
A10 = 1.76551e−03, A12 = −2.03412e−04, A14 = 9.98685e−06

| | |
|---|---|
| Half angel of view | 39.5 |
| Focal length | 3.68 |
| fb (in air) | 1.11 |
| Lens total length (in air) | 4.10 |

Example 11

| Unit mm | | | | |
|---|---|---|---|---|
| Surface data | | | | |
| Surface no. | r | d | nd | vd |
| Object plane | ∞ | ∞ | | |
| 1 (stop) | ∞ | −0.28 | | |
| 2* | 1.636 | 0.45 | 1.53048 | 55.71 |
| 3* | −20.000 | 0.12 | | |
| 4* | ∞ | 0.30 | 1.63415 | 23.96 |
| 5* | 2.511 | 0.29 | | |
| 6* | 3.101 | 0.45 | 1.53048 | 55.71 |
| 7* | 8.333 | 0.54 | | |
| 8* | −4.840 | 0.50 | 1.53048 | 55.71 |
| 9* | −1.325 | 0.57 | | |
| 10* | −2.439 | 0.35 | 1.53048 | 55.71 |
| 11* | 2.147 | 0.55 | | |
| 12 | ∞ | 0.30 | 1.51633 | 64.14 |
| 13 | ∞ | 0.08 | | |
| Image plane | ∞ | | | |

Aspherical surface data

2nd surface k = −0.038
A4 = −1.06844e−02, A6 = 4.74155e−02, A8 = −8.82139e−02,
A10 = 1.16522e−01

-continued

| Unit mm |
|---|

3rd surface k = 0.000
A4 = 8.54837e−03, A6 = 2.04101e−01, A8 = −2.15759e−01,
A10 = 1.92020e−01

4th surface k = 0.000
A4 = −2.99553e−02, A6 = 3.61917e−01, A8 = −3.75964e−01,
A10 = 1.24289e−01

5th surface k = −25.864
A4 = 7.73761e−02, A6 = 1.68660e−01, A8 = −2.43279e−01,
A10 = 1.57431e−01, A12 = −7.69841e−02

6th surface k = −47.150
A4 = −5.76778e−03, A6 = −9.87599e−02, A8 = 1.30998e−01,
A10 = 1.00235e−01, A12 = −3.38219e−02

7th surface k = −49.474
A4 = −1.07549e−01, A6 = 3.15557e−02, A8 = −6.24924e−02,
A10 = 5.68501e−02, A12 = −4.09334e−03

8th surface k = 0.000
A4 = −5.69153e−03, A6 = −4.80032e−02, A8 = 2.67324e−02,
A10 = −2.40212e−02, A12 = 1.95764e−03

9th surface k = −5.246
A4 = −8.51151e−02, A6 = 7.48039e−02, A8 = −2.46349e−02,
A10 = 3.61251e−03, A12 = −2.89340e−04

10th surface k = −1.827
A4 = −6.65919e−02, A6 = 2.32721e−02, A8 = 1.78814e−04,
A10 = −9.02923e−04, A12 = 6.93806e−05, A14 = 8.04271e−06

11th surface k = −18.037
A4 = −7.53144e−02, A6 = 2.69268e−02, A8 = −8.86936e−03,
A10 = 1.77280e−03, A12 = −2.03990e−04, A14 = 9.36126e−06

| | |
|---|---|
| Half angel of view | 36.9 |
| Focal length | 3.90 |
| fb (in air) | 0.83 |
| Lens total length (in air) | 4.40 |

Next, the values of conditional expressions (1) to (9) in each example are shown below.

| Conditional expressions | Example 1 | Example 2 | Example 3 |
|---|---|---|---|
| (1) $f_1/f_3$ | 0.16 | 0.41 | 0.34 |
| (2) IH/EXP | −0.94 | −0.98 | −1.09 |
| (3) $f_3/f_4$ | 8.08 | 3.59 | 4.36 |
| (4) $EA_5/EA_4$ | 1.64 | 1.71 | 1.66 |
| (5) TL/(2 × IH) | 0.82 | 0.69 | 0.75 |
| (6) $f_3/f$ | 4.75 | 2.08 | 2.40 |
| (7) $r_7/f$ | 0.78 | 4.81 | 2.56 |
| (8) $\Sigma d_L/f$ | 0.62 | 0.62 | 0.58 |
| (9) $(r_{10} + r_{11})/(r_{10} − r_{11})$ | 0.93 | 0.65 | 0.62 |

| Conditional expressions | Example 4 | Example 5 |
|---|---|---|
| (1) $f_1/f_3$ | 0.38 | 0.38 |
| (2) IH/EXP | −1.24 | −1.32 |
| (3) $f_3/f_4$ | 3.80 | 3.66 |
| (4) $EA_5/EA_4$ | 1.71 | 1.71 |
| (5) TL/(2 × IH) | 0.68 | 0.66 |
| (6) $f_3/f$ | 2.27 | 2.28 |
| (7) $r_7/f$ | 3.79 | 4.15 |

-continued

| | Example 6 | Example 7 | Example 8 |
|---|---|---|---|
| (8) $\Sigma d_L/f$ | | 0.64 | 0.59 |
| (9) $(r_{10}+r_{11})/(r_{10}-r_{11})$ | | 0.66 | 0.56 |

| Conditional expressions | Example 6 | Example 7 | Example 8 |
|---|---|---|---|
| (1) $f_1/f_3$ | 0.36 | 0.51 | 0.52 |
| (2) IH/EXP | −1.08 | −1.18 | −1.15 |
| (3) $f_3/f_4$ | 3.66 | 2.60 | 2.09 |
| (4) $EA_5/EA_4$ | 1.46 | 1.45 | 1.43 |
| (5) TL/(2 × IH) | 0.74 | 0.74 | 0.78 |
| (6) $f_3/f$ | 2.25 | 1.61 | 1.55 |
| (7) $r_7/f$ | 2.38 | 2.80 | 2.69 |
| (8) $\Sigma d_L/f$ | 0.54 | 0.52 | 0.45 |
| (9) $(r_{10}+r_{11})/(r_{10}-r_{11})$ | 0.16 | 0.14 | 0.07 |

| Conditional expressions | Example 9 | Example 10 | Example 11 |
|---|---|---|---|
| (1) $f_1/f_3$ | 0.54 | 0.37 | 0.32 |
| (2) IH/EXP | −0.93 | −1.54 | −1.19 |
| (3) $f_3/f_4$ | 2.78 | 2.27 | 2.76 |
| (4) $EA_5/EA_4$ | 1.44 | 1.57 | 1.49 |
| (5) TL/(2 × IH) | 0.86 | 0.64 | 0.77 |
| (6) $f_3/f$ | 1.59 | 1.97 | 2.31 |
| (7) $r_7/f$ | 2.76 | 2.93 | 2.14 |
| (8) $\Sigma d_L/f$ | 0.53 | 0.53 | 0.53 |
| (9) $(r_{10}+r_{11})/(r_{10}-r_{11})$ | 0.06 | 0.52 | 0.06 |

It is possible to use such an imaging (image pickup) optical system of the present invention described above in an image pickup apparatus in which an image of an object is photographed by an electric image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 24:
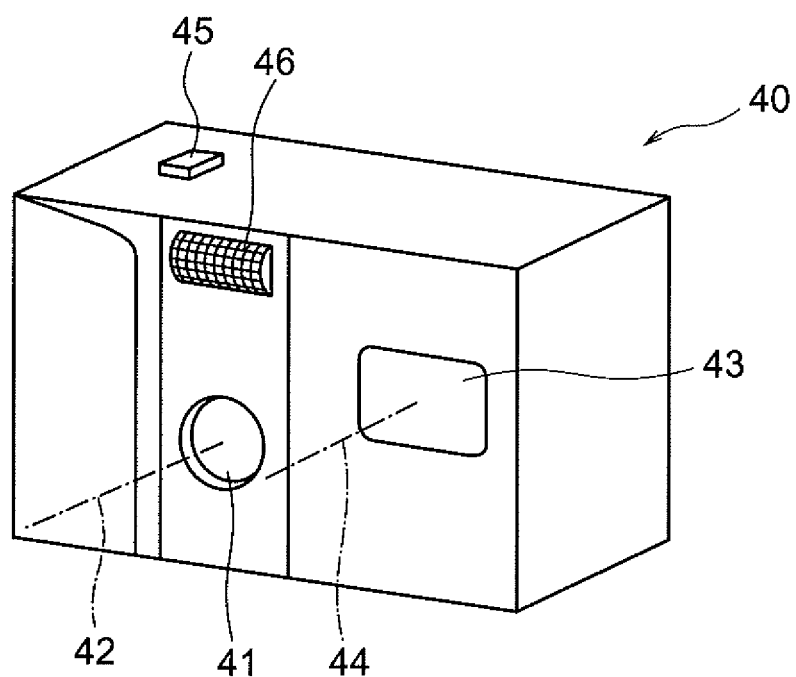
FIG. 24 is a front perspective view showing an appearance of a digital camera 40 in which, the optical system according to the present invention has been incorporated.
Figure 25:
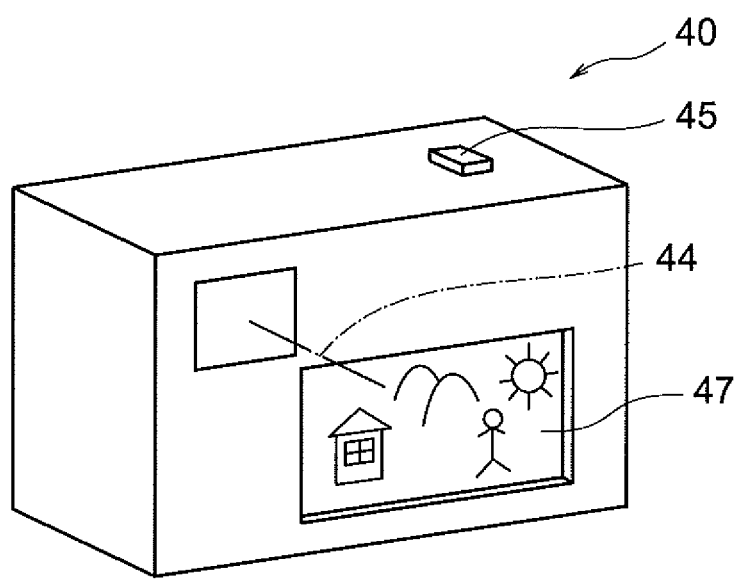
FIG. 25 is a rear perspective view of the digital camera 40.
Figure 26:
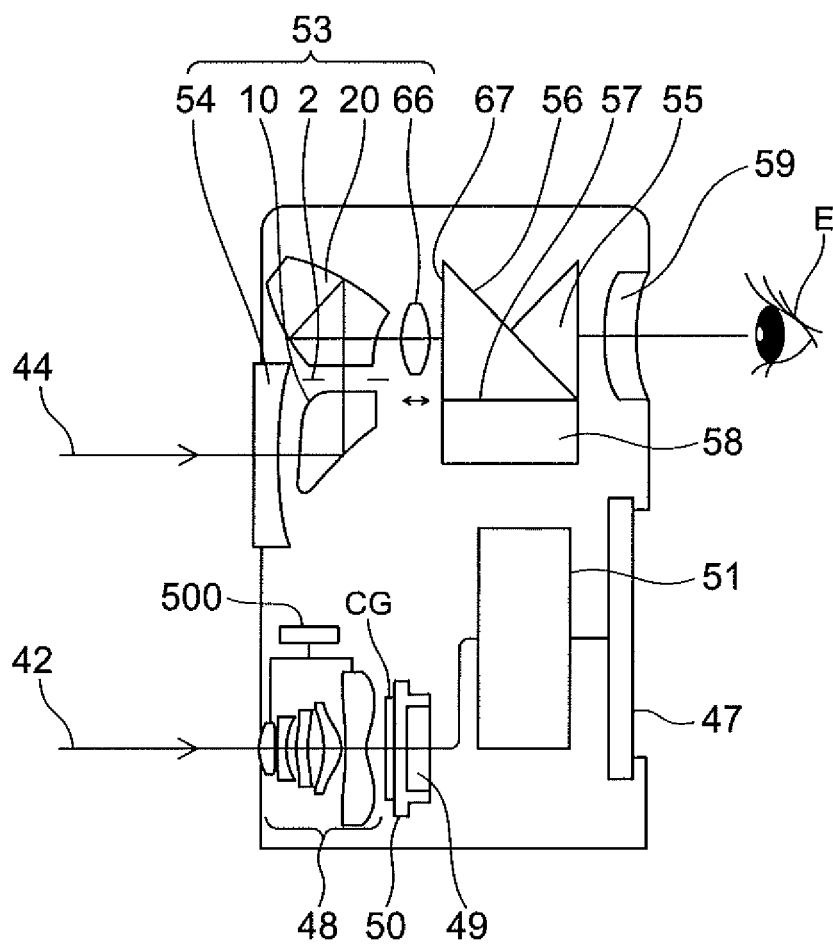
FIG. 26 is a cross-sectional view showing an optical arrangement in the digital camera 40.

In FIG. 24 to FIG. 26 show conceptual diagrams of structures in which the imaging optical system according to the present invention is incorporated in a photographic optical system 41 of a digital camera. FIG. 24 is a frontward perspective view showing an appearance of a digital camera 40, FIG. 25 is a rearward perspective view of the same, and FIG. 26 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed by a photographer, in conjugation with this, a photograph is taken through the photographic optical system 41 such as the image pickup optical system 48 in the first example.

An object image formed by the photographic optical system 41 is formed on an image pickup surface of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame 57 of a Porro prism 55 which is an image erecting member. On a rear side of this Porro prism 55, an eyepiece optical system 59 which guides an image formed as an erected normal image to a viewer's eyeball E is disposed.

By the digital camera 40 structured in such manner, it is possible to realize an optical image pickup apparatus having a image pickup optical system with a reduced size and thickness, in which the number of structural components is reduced. Further, the present invention could be applied not only the above-mentioned collapsible type digital camera but also a bending type digital camera having a bending optical system.

The digital camera includes an auto-focus mechanism 500 which is integrated with an image pickup optical system. By installing the auto-focus mechanism 500, it is possible to focus at any object distance.

Moreover, it is desirable that the image pickup optical system 41 and an electronic image pickup element chip (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 27:
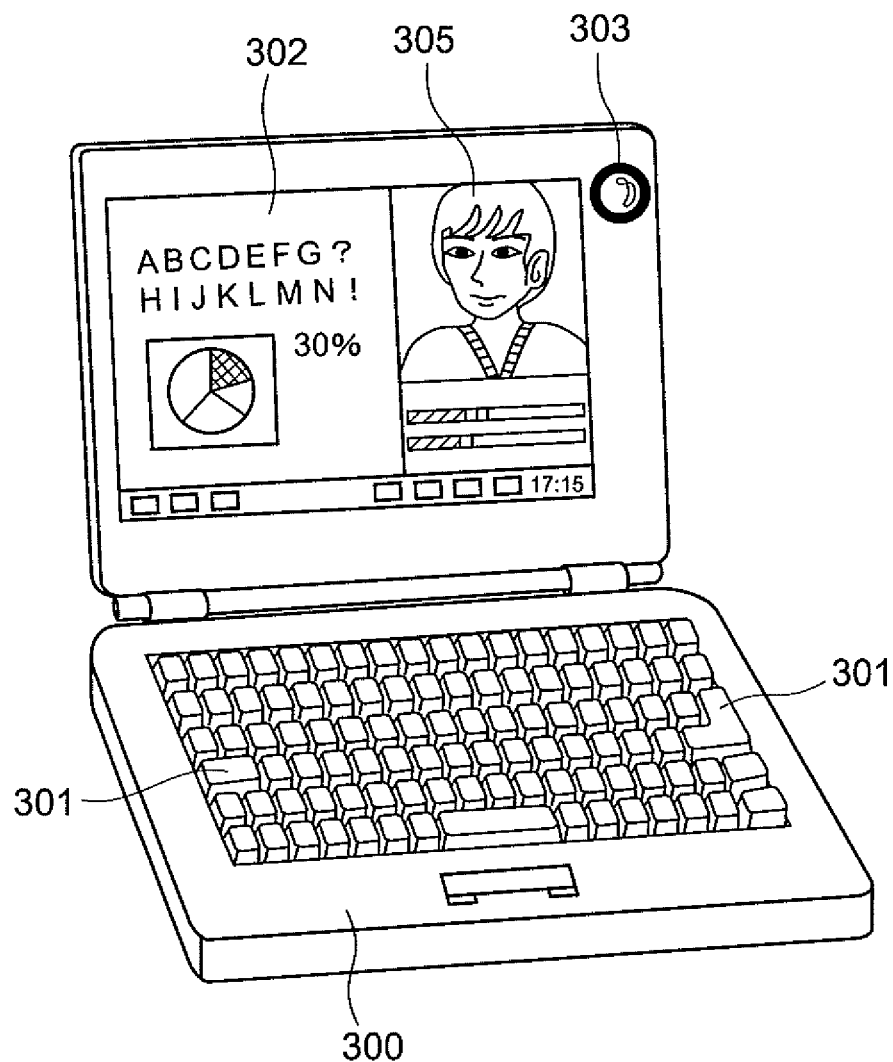
FIG. 27 is a front perspective view of a state in which, a cover of a personal computer 300 which is an example of an information processing apparatus in which, the optical system according to the present invention has been built-in as an objective optical system, is open.
Figure 28:
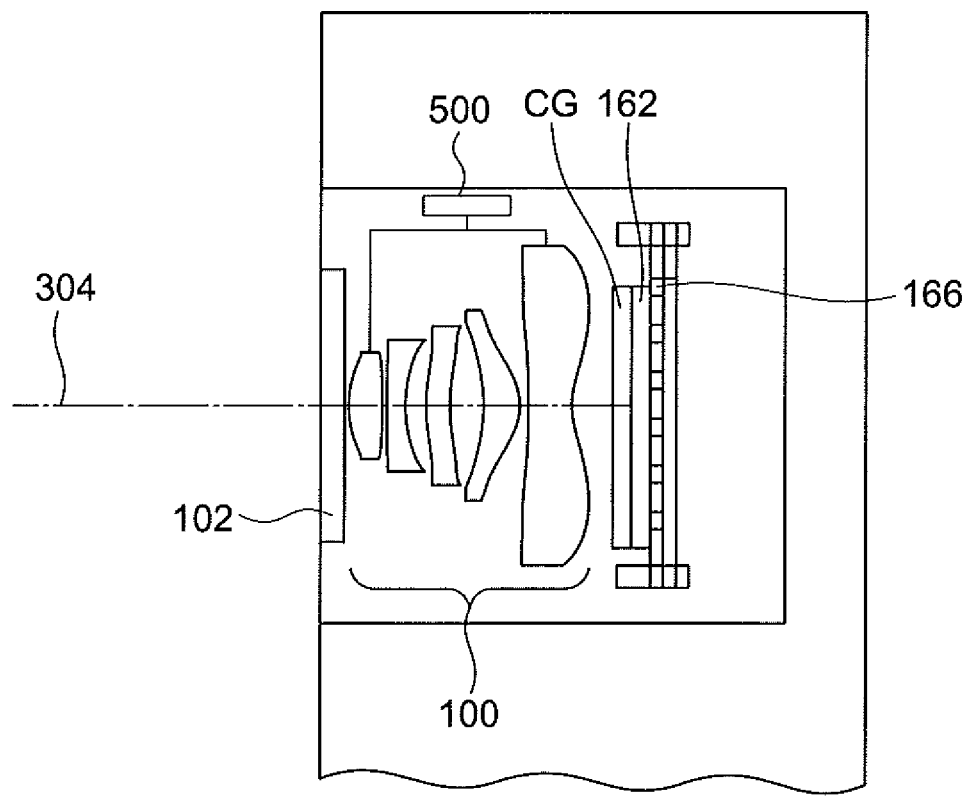
FIG. 28 is a cross-sectional view of a photographic optical system 303 of the personal computer 300.
Figure 29:
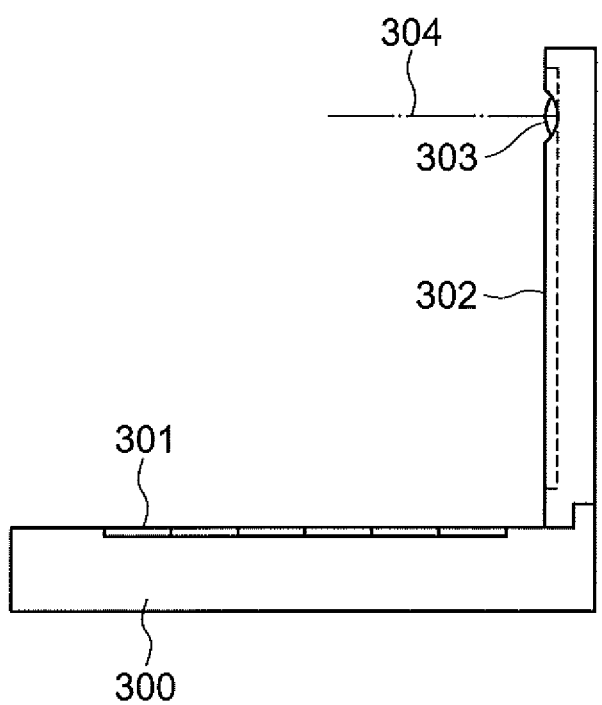
FIG. 29 is a side view of the personal computer 300.

Next, a personal computer which is an example of an information processing apparatus with a built-in image forming system as an objective optical system is shown in FIG. 27 to FIG. 29. FIG. 27 is a frontward perspective view of a personal computer 300 with its cover opened, FIG. 28 is a cross-sectional view of a photographic optical system 303 of the personal computer 300, and FIG. 29 is a side view of FIG. 27. As it is shown in FIG. 27 to FIG. 29, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the image pickup optical system in the first example for instance, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 27, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer 300 includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Next, a telephone which is an example of an information processing apparatus in which the image forming optical system of the present invention is built-in as a photographic optical system, particularly a portable telephone which is easy to carry is shown in FIG. 30A, FIG. 30B, and FIG. 30C. FIG. 30A is a front view of a portable telephone 400, FIG. 30B is a side view of the portable telephone 400, and FIG. 30C is a cross-sectional view of a photographic optical system 405. As shown in FIG. 30A to FIG. 30C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first example for instance, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone 400 includes an auto-focus mechanism 500 which is integrated with an objective optical system. 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

The present invention can have various embodiments without departing from the scope of the invention.

As it has been described above, the present invention can provide an image pickup optical system in which, an overall length of the optical system is maintained to be short, and a lens diameter is maintained to be small, and various aberrations, particularly, the coma, are corrected favorably, while being an optical system with a comparatively small F-number, and an image pickup apparatus in which such image pickup optical system is used.

What is claimed is:

1. An image pickup optical system comprising in order from an object side:
a first lens having a positive refractive power;
a second lens having a negative refractive power;
a third lens having a positive refractive power;
a fourth lens having a positive refractive power; and
a fifth lens having a negative refractive power, wherein
the fourth lens is a meniscus lens having a convex surface directed toward an image side, and
an aperture stop is disposed nearest to the object side, and
the following conditional expressions are satisfied:

$$0.5 < TL/(2 \times IH) < 1.5, \text{ and}$$

$$0.4 < \Sigma d_L/f < 0.55,$$

where,
TL denotes an overall length of the image pickup optical system,
IH denotes an image height,
$\Sigma d_L$ denotes a total thickness of lenses of the image pickup optical system, and
f denotes a focal length of the image pickup optical system.

2. The image pickup optical system according to claim 1, wherein the following conditional expression is satisfied:

$$1.5 < f_3/f < 2.5$$

where,
$f_3$ denotes a focal length of the third lens, and
f denotes a focal length of the overall image pickup optical system.

3. The image pickup optical system according to claim 1, wherein a shape of the third lens is a meniscus shape having a convex surface directed toward the object side.

4. The image pickup optical system according to claim 1, wherein an image-side surface of the third lens has a shape such that a concave surface is directed toward an image side, near an optical axis, and a shape such that a convex surface is directed toward the image side, at a peripheral portion.

5. The image pickup optical system according to claim 1, wherein the following conditional expression is satisfied:

$$2.0 < r_7/f < 3.0$$

where, $r_7$ denotes a paraxial radius of curvature of an image-side surface of the third lens, and f denotes a focal length of the overall image pickup optical system.

6. The image pickup optical system according to claim 1, wherein the following conditional expression is satisfied:

$$0.05 < (r_{10}+r_{11})/(r_{10}-r_{11}) < 0.6$$

where, $r_{10}$ denotes a paraxial radius of curvature of an object-side surface of the fifth lens, and $r_{11}$ denotes a paraxial radius of an image-side surface of the fifth lens.

7. The image pickup optical system according to claim 1, wherein the aperture stop is positioned at an image side of an object-side vertex of the first lens.

8. The image pickup optical system according to claim 1, wherein each of the first lens, the second lens, the third lens, the fourth lens, and the fifth lens are formed of a resin.

9. An image pickup apparatus comprising:
an image pickup optical system according to claim 1; and
an image pickup element.

10. The image pickup apparatus according to claim 9, wherein the image pickup optical system and the image pickup element are integrated.

11. The image pickup apparatus according to claim 9, wherein the image pickup optical system is integrated with an auto-focus mechanism.

* * * * *

UNITED STATES PATENT AND TRADEMARK OFFICE
CERTIFICATE OF CORRECTION

PATENT NO. : 8,964,309 B2  
APPLICATION NO. : 13/789954  
DATED : February 24, 2015  
INVENTOR(S) : Uchida et al.

Page 1 of 1

It is certified that error appears in the above-identified patent and that said Letters Patent is hereby corrected as shown below:

In the Specification at column 18, line 26, change "v1, vd2" to "vd1, vd2";
at column 18, line 41, change "/" to "]";
at column 18, line 39, after "$A10$," add "...";
at column 18, line 41, change "$A6y+A8y$" to "$A6y^6+A8y^8$";
at column 18, line 42, after "$A10y^{10}$" add "+...";
at column 20, line 54, change "10h" to "10th";
at column 21, line 55, change "10h" to "10th";
at column 21, line 59, change "11h" to "11th";
at column 24, line 65, change "angel" to "angle";
at column 26, line 9, change "angel" to "angle";
at column 27, line 17, change "angel" to "angle";
at column 28, line 25, change "angel" to "angle";
at column 29, line 33, change "angel" to "angle"; and
at column 30, line 41, change "angel" to "angle".

Signed and Sealed this
Sixteenth Day of June, 2015

Michelle K. Lee
*Director of the United States Patent and Trademark Office*